United States Patent
Kendrick et al.

(10) Patent No.: US 7,003,961 B2
(45) Date of Patent: Feb. 28, 2006

(54) TRAPPED VORTEX COMBUSTOR

(75) Inventors: Donald Kendrick, Sammamish, WA (US); Shawn P. Lawlor, Redmond, WA (US); Robert C. Steele, Woodinville, WA (US)

(73) Assignee: Ramgen Power Systems, Inc., Bellevue, WA (US)

( * ) Notice: Subject to any disclaimer, the term of this patent is extended or adjusted under 35 U.S.C. 154(b) by 0 days.

(21) Appl. No.: 10/430,849

(22) Filed: May 5, 2003

(65) Prior Publication Data

US 2004/0020211 A1     Feb. 5, 2004

Related U.S. Application Data

(63) Continuation-in-part of application No. 10/200,780, filed on Jul. 23, 2002, now Pat. No. 6,694,743.

(60) Provisional application No. 60/386,195, filed on Jul. 23, 2001.

(51) Int. Cl.
*F02C 3/00* (2006.01)
*F23R 3/18* (2006.01)
*F23R 3/20* (2006.01)

(52) U.S. Cl. .......................... 60/776; 60/749; 60/750; 60/737

(58) Field of Classification Search .......... 60/764–765, 60/749, 750, 737, 776
See application file for complete search history.

(56) References Cited

U.S. PATENT DOCUMENTS

| | | | |
|---|---|---|---|
| 2,680,950 A | 6/1954 | Burch | |
| 2,688,371 A | 9/1954 | Del Pesaro | |
| 2,690,809 A | 10/1954 | Kerry | |
| 2,709,889 A | 6/1955 | Mount | |
| 2,709,895 A | 6/1955 | Mount | |
| 2,748,563 A | 6/1956 | Wiktor | |
| 2,784,551 A | 3/1957 | Karlby et al. | |
| 2,867,979 A | 1/1959 | Mullen, II | |
| 3,007,310 A | 11/1961 | Eisele | |
| 3,038,301 A | 6/1962 | Carlson | |
| 3,054,259 A * | 9/1962 | Arthur et al. ................. 60/749 |
| 3,118,277 A | 1/1964 | Wormser | |

(Continued)

FOREIGN PATENT DOCUMENTS

WO    WO 9827330 A1    6/1998
WO    WO 0017492 A1    3/2000

OTHER PUBLICATIONS

Katta, V. and Roquemore, W. Numerical Studies on Trapped-Vortex Concepts For Stable Combustion. Presented at the ASME Turbo Asia Conference, Nov. 5-7, 1996, Jakarta, Indonesia.

(Continued)

*Primary Examiner*—Ted Kim
(74) *Attorney, Agent, or Firm*—R. Reams Goodloe, Jr.

(57) ABSTRACT

A trapped vortex combustor for gas turbine engines. An annular combustor housing is provided having a plurality of inlet centerbodies disposed along a helical axis. The inlet centerbodies include a leading edge structure, opposing sidewalls, a pressurizable cavity, and a rear wall. Inlet centerbodies cooperate with adjacent structure and an aft bluff body to define a trapped vortex cavity combustion chamber for mixing an inlet fluid and burning fuel to form hot combustion gases. Mixing is enhanced by utilizing struts adjacent to the rear wall to create eddies in the fluid flow, and by injecting fuel and/or air in opposition to swirl created by the bulk fluid flow. Hot combustion gases are utilized in a turbine for extraction of kinetic energy, or in heat exchange equipment for recovery of thermal energy. High combustion efficiencies and less than 10 ppm emissions of oxides of nitrogen and of carbon monoxide are achieved.

57 Claims, 13 Drawing Sheets

U.S. PATENT DOCUMENTS

| | | | |
|---|---|---|---|
| 3,325,993 | A | 6/1967 | Gulyas |
| 3,455,108 | A | 7/1969 | Clare et al. |
| 3,722,216 | A | 3/1973 | Bahr et al. |
| 3,727,409 | A | 4/1973 | Kelley et al. |
| 3,729,930 | A | 5/1973 | Williams |
| 3,818,696 | A | 6/1974 | Beaufrere |
| 3,864,907 | A | 2/1975 | Curran |
| 3,880,571 | A | 4/1975 | Koppang et al. |
| 3,971,209 | A | 7/1976 | De Chair |
| 4,024,705 | A | 5/1977 | Hedrick |
| 4,048,797 | A * | 9/1977 | Hakluytt et al. ............... 60/749 |
| 4,066,381 | A | 1/1978 | Earnest |
| 4,197,869 | A | 4/1980 | Moncrieff-Yeates |
| 4,350,009 | A | 9/1982 | Holzapfel |
| 4,389,185 | A | 6/1983 | Alpkvist |
| 4,455,839 | A | 6/1984 | Wuchter |
| 4,586,443 | A | 5/1986 | Burge et al. |
| 4,641,495 | A | 2/1987 | Mowill |
| 4,702,073 | A | 10/1987 | Melconian |
| 4,728,282 | A | 3/1988 | May |
| 4,996,837 | A | 3/1991 | Shekleton |
| 4,996,838 | A | 3/1991 | Melconian |
| 5,025,622 | A | 6/1991 | Melconian |
| 5,123,361 | A | 6/1992 | Nieh et al. |
| 5,161,945 | A | 11/1992 | Clevenger et al. |
| 5,372,005 | A | 12/1994 | Lawlor |
| 5,372,008 | A | 12/1994 | Sood |
| 5,619,855 | A | 4/1997 | Burrus |
| 5,647,215 | A | 7/1997 | Sharifi et al. |
| 5,657,632 | A | 8/1997 | Foss |
| 5,709,076 | A | 1/1998 | Lawlor |
| 5,791,148 | A | 8/1998 | Burrus |
| 5,791,889 | A | 8/1998 | Gemmen et al. |
| 5,809,769 | A | 9/1998 | Richards et al. |
| 5,839,283 | A | 11/1998 | Dobbeling |
| 5,857,339 | A | 1/1999 | Roquemore et al. |
| 5,983,622 | A | 11/1999 | Newburry et al. |
| 6,082,111 | A | 7/2000 | Stokes |
| 6,263,660 | B1 | 7/2001 | Lawlor |
| 6,279,309 | B1 | 8/2001 | Lawlor et al. |
| 6,286,298 | B1 | 9/2001 | Burrus et al. |
| 6,286,317 | B1 | 9/2001 | Burrus et al. |
| 6,295,801 | B1 | 10/2001 | Burrus et al. |
| 6,334,298 | B1 | 1/2002 | Aicholtz |
| 6,334,299 | B1 | 1/2002 | Lawlor |
| 6,374,615 | B1 | 4/2002 | Zupanc et al. |
| 6,481,209 | B1 | 11/2002 | Johnson et al. |
| 6,796,130 | B1 * | 9/2004 | Little et al. .................... 60/782 |
| 2002/0112482 | A1 | 8/2002 | Johnson et al. |

OTHER PUBLICATIONS

Sturgess, G.J., and Hsu, K. Entrainment of Mainstream Flow In A Trapped-Vortex Combustor. AIAA 97-0261. Innovative Scientific Solutions, Inc., Beavercreek, Ohio, 35th Aerospace Sciences Meeting & Exhibit, Jan. 6-10, 1997, Reno Nevada.

Katta, V. and Roquemore, W.M.. Numerical Studies on Trapped-Vortex Concepts for Stable Combustion. Transactions of the ASME, vol. 120, Jan. 1998.

Katta, V. and Roquemore, W.M.. Study On Trapped-Vortex Combustor—Effect of Injection on Flow Dynamics. Journal of Propulsion and Power, vol. 14. No. 3, May-Jun., 1998. Presented as Paper 97-3256 at the AIAA/ASME/SAE/ASEE 33rd Joint Propulsion Conference and Exhibit, Seattle Washington, Jul. 1997.

Hsu, K and Roquemore, W. Characteristics of a Trapped Vortex Combustor. Journal of Propulsion and Power, vol. 14, No. 1, Jan. -Feb., 1998. Presented as Paper No. 95-0810 at the AIAA 33rd Aerospace Sciences Meeting, Reno, Nevada, Jan. 1995.

Sturgess, G.J., and Hsu, K. Combustion Characteristics of a Trapped Vortex Combustor. Paper presented at the RTO AVT Symposium on "Gas Turbine Engine Combustion, Emissions and Alternative Fuels", Lisbon, Portugal, Oct. 12-16, 1998 and published in RTO MP-14.

Hsu, K; Carter, C.D. et al. Characteristics of Combustion Instability Associated with Trapped-Vortex Burner. Air Force Research Laboratory, Wright-Patterson AFB, OH; 37th AIAA Aerospace Sciences Meeting & Exhibit; Jan. 11-14, 1999, Reno Nevada.

Stone, C. and Menon, Suresh. Simulation of Fuel-Air Mixing and Combustion In A Trapped-Vortex Combustor. School of Aerospace Engineering, Georgia Institute of Technology; 38th AIAA Aerospace Sciences Meeting & Exhibit; Jan. 10-13, 2000, Reno Nevada.

Roquemore, W.M.; Shouse, Dale. et al. Trapped Vortex Combustor Concept for Gas Turbine Engines. AIAA 2001-0483; 39th AIAA Aerospace Sciences Meeting & Exhibit; Jan. 8-11, 2001, Reno Nevada.

Burrus, D.L, Johnson, A.W. et al. Performance Assessment Of A Prototype Trapped Vortex Combustor Concept For Gas Turbine Application. 2001-GT-0087. Proceedings of ASME Turbo Expo 2001, Jun. 4-7, 2001, New Orleans, Louisiana.

Straub, D., Casleton, K. et al. Assessment of Rich-Quench-Lean Trapped Vortex Combustor for Stationary Gas Turbines. U.S. Department of Energy, National Energy Technology Laboratory, Morgantown, WV. ASME GT2003-38569 DRAFT. Proceedings of ASME Turbo Expo 2003, Power for Land, Sea and Air, Jun. 16-19, 2003, Atlanta, Georgia.

* cited by examiner

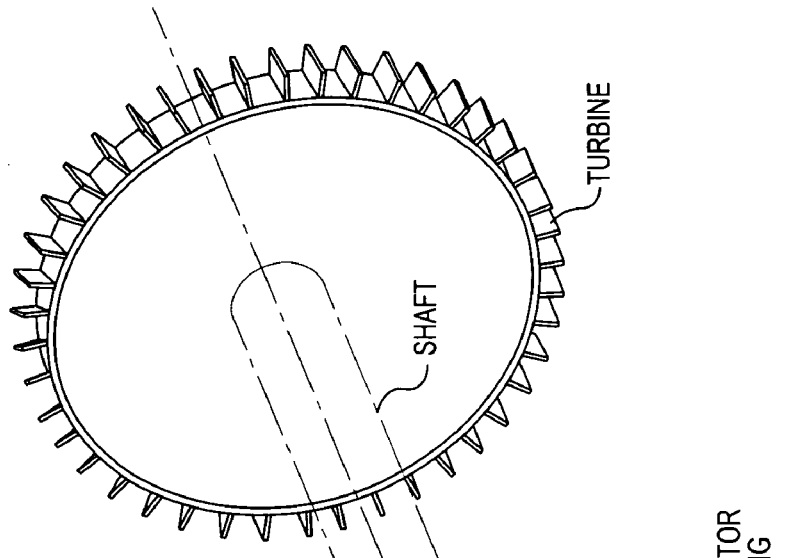
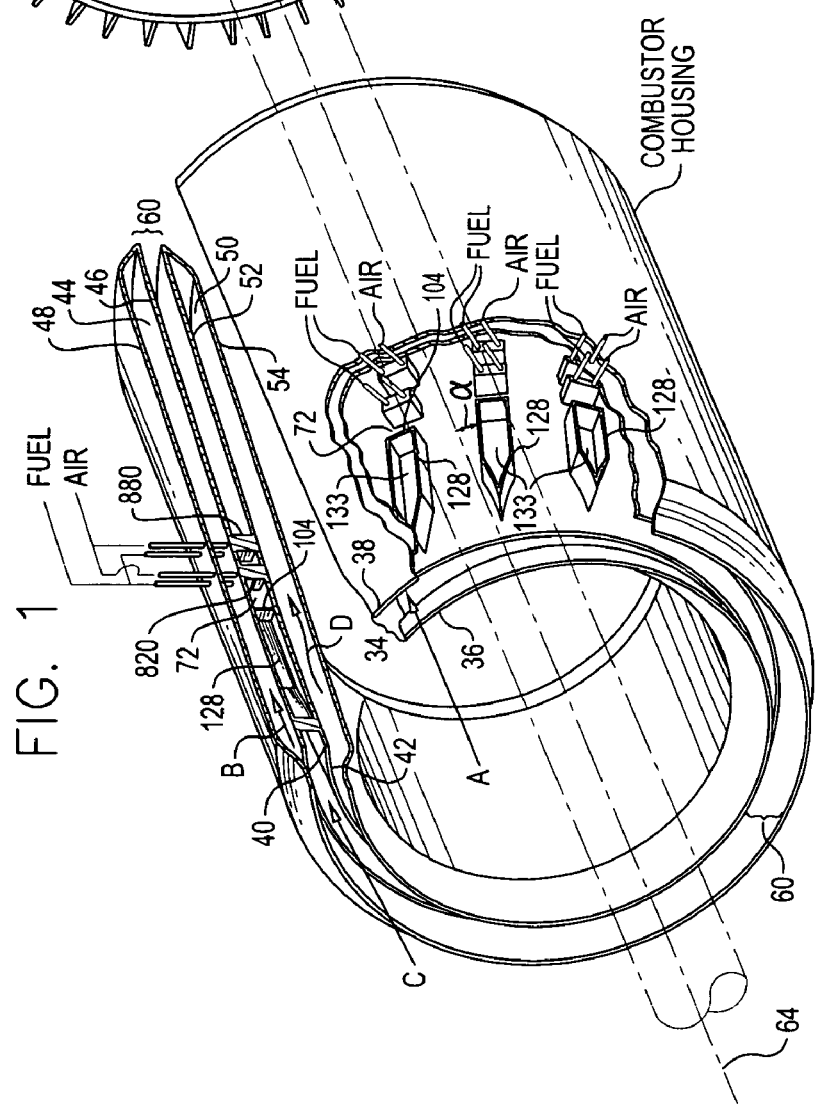
FIG. 1

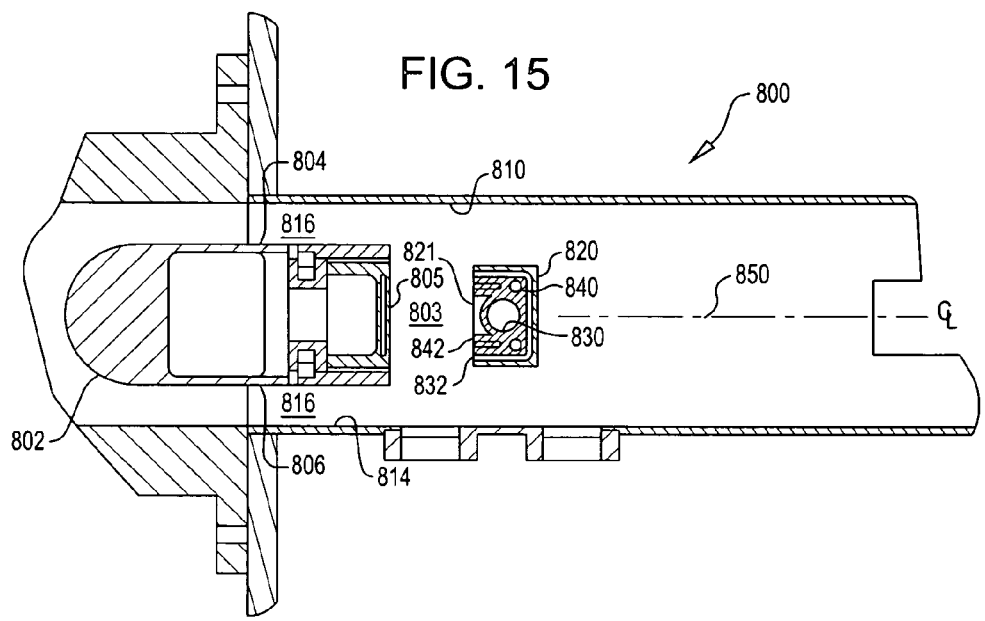
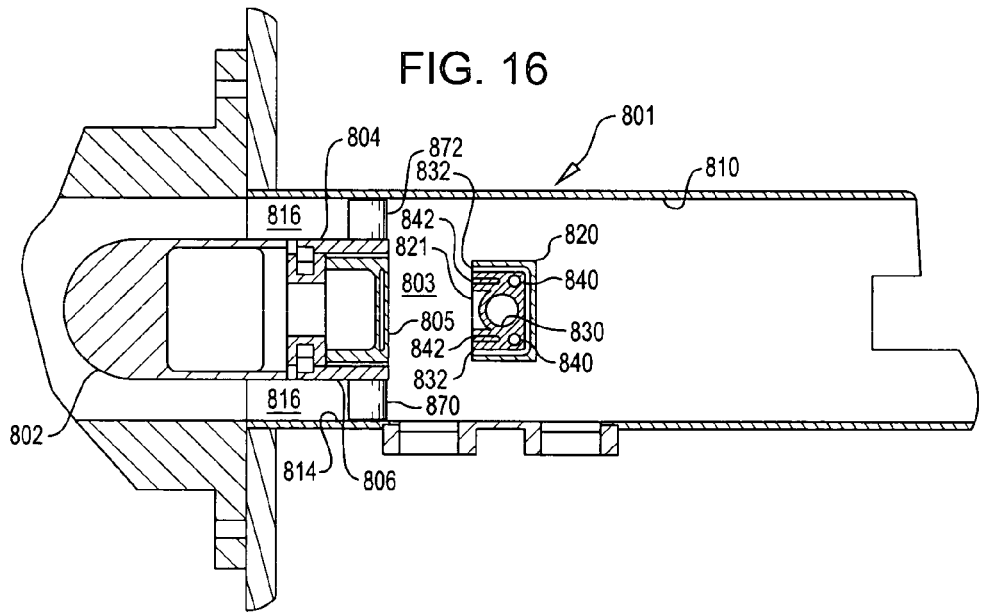

NOx PERFORMANCE VERSUS $\phi_{fe}$ FOR THE BASELINE TVC CONFIGURATION

CO PERFORMANCE VERSUS $\phi_{fe}$ FOR THE BASELINE TVC CONFIGURATION

SUMMARY OF ALL BASELINE TVC TESTS

COMBUSTION EFFICIENCY VERSES SEVERITY PARAMETER FOR ALL BASELINE TVC RUNS

SUMMARY OF ALL BASELINE TVC TESTS BELOW 50ppm OF CO

COMBUSTION EFFICIENCY COMPARISON BETWEEN BOTH TVC CONFIGURATIONS

NOx-CO PLOT FOR THE TVC/STRUT CONFIGURATION

TRAPPED VORTEX COMBUSTOR

RELATED PATENT APPLICATIONS

This application is a continuation-in-part of application Ser. No. 10/200,780 filed on Jul. 23, 2002 now U.S. Pat. No. 6,694,743. That application also claimed the benefit of priority from U.S. Provisional Patent Application Ser. No. 60/386,195, filed Jul. 17, 2002, which was converted on Jul. 17, 2002 from originally filed U.S. Non-Provisional Patent Application Ser. No. 09/912,265 filed on Jul. 23, 2001, the disclosures of each of which is incorporated herein in their entirety by this reference.

TECHNICAL FIELD

This invention relates to the field of combustion technology. More particularly, the invention relates to the design of a combustor especially suited for use in a gas turbine engine.

BACKGROUND

Gas turbine engines have been widely utilized as prime movers in stationary power generation plants. However, improvements in combustion efficiency, which would be especially advantageous in order to reduce emissions, would be desirable. In various attempts to achieve such improvements, many different methods and structures have been tried, either experimentally or commercially. Some of such attempts have included the use of recirculation zones to provide a continuous ignition source by mixing hot combustion products with the incoming fuel and air mixture. Structural devices such as swirl vanes, bluff bodies, and rearward facing steps have commonly been employed to establish recirculation zones for flame stability. The challenge, however, has been in fuel introduction methodology, and the structure of a flame stabilizer that ensures performance (including acceptable emissions and acoustic stability) while reducing capital and operating costs.

Flame stabilization criteria are even more important when operating at trans-sonic or supersonic inlet conditions. It would be especially desirable for burners operating under such conditions to have flame stabilizers that would be highly resistant to external flow field dynamics and/or perturbations.

Consequently, it would be desirable to provide a combustor for a gas turbine engine, specifically including combustion chamber structure that enables the engine to maintain high combustion efficiency while reducing the emission of undesirable products of combustion such as (a) nitrogen oxides, (b) partially oxidized hydrocarbons, and (c) carbon monoxide.

Moreover, it is beneficial in such devices that efficient and effective combustor cooling be achieved. Such a design approach increases combustor operating life (and thus achieves overall reduction in life cycle costs, while maximizing combustion efficiency.

Depending upon the specific operating needs of a particular implementation, certain subsets of (or even all) of the foregoing can be implemented using various combinations of exemplary embodiments, or variations of certain aspects of such exemplary embodiments.

SUMMARY

One embodiment of a novel combustor design for a gas turbine engine disclosed herein has a combustor configuration in which a flameholder is provided that extends between inner and outer combustion chamber walls. In one embodiment the inner and outer walls are each substantially cylindrical, and thus form an annular combustion chamber in which a plurality of radially extending flame holders are provided.

One design utilizes an inlet centerbody in which compression is achieved at preselected inlet velocities by exploiting an oblique shock extending from a leading edge structure laterally outwardly to, at the design velocity, adjacent centerbody structures. In such case, the centerbodies and accompanying aft bluff bodies are affixed in a preselected, substantially matched orientation, so as to smoothly and continuously acquire clean compressed inlet air, and to efficiently and reliably discharge the resulting products of combustion. In one configuration, a plurality of centerbodies are oriented at a helical angle within an annular combustor housing.

The annular combustor housing is simplified in that a rear wall of an inlet centerbody serves as an upstream wall of a combustion chamber, providing flame holding. By virtue of the rear wall of the inlet centerbody extending outward from the inner chamber wall to the outer chamber wall, and the use of a first bluff body likewise extending outward between the inner chamber wall and the outer combustor wall, then located a distance downstream a trapped vortex combustor cavity is defined to provide for thorough mixing of fuel and air, sufficient residence time for reaction of fuel with oxidant to minimize the escape of incomplete combustion products, and general flame stability.

The foregoing combustion chamber configuration is designed for efficient mixing of fuel and air, especially at supersonic inlet inflow velocities. By the utilization of a rear wall of an inlet body, a separation streamline is formed dividing the incoming cold charge with a highly energetic locked vortex pair located between the fore and aft bodies. This arrangement provides for a more compact primary zone and for stable flameholding that is desirable over an extended operating range. Use of fuel and/or oxidizer injection opposite to the natural rotation sense of the trapped vortices has found to still further enhance the mixing of fuel and air in such combustion chambers. The above mentioned embodiment provides increased combustion intensity through improved fuel/air mixing, over conventional schemes. A still further feature is provided by an embodiment incorporating side struts extending at or adjacent the rear wall of the centerbody, so that some primary zone hot products are more easily convected into the unreacted inlet flow for increased performance. In another variation, multiple trapped vortex cavities are provided, by use of multiple aft bluff bodies, which may, but need not use secondary injection to enhance performance.

Further, it is to be understood that although a combustor cavity having roughly a segmented annular shape and having a substantially rectangular cross-section at any selected station along the flow path is depicted, other designs utilizing an inlet body rear wall flameholder shape other than that just described are also possible (e.g., rectangular cross-sectional shape, or non-rectangular cross-sectional shape). However, by optimizing combustor volume, i.e., operating at desirable pressures and temperatures to optimize heat release while maintaining desirable temperature profile and emission results, the "hot section" components of an engine utilizing such trapped vortex combustors may be advantageously reduced.

In another embodiment, a fuel/air pre-mixture may be supplied at high velocity via inlet fluid compression ducts adjacent to an inlet centerbody, so that flashback from the combustor may be reliably avoided even in the case of fuels that have a very high flame velocity. Such a high velocity inlet can also serve to acoustically decouple the upstream flow acoustics from combustion chamber acoustics.

BRIEF DESCRIPTION OF THE DRAWING

In order to enable the reader to attain a more complete appreciation of the invention, and of the novel features and the advantages thereof, attention is directed to the following detailed description when considered in connection with the accompanying drawings, wherein:

FIG. 1 shows a partially sectioned perspective view of a combustor section provided for mounting in a gas turbine engine, ready to receive compressed air through an inlet between inner and outer combustor walls, and also showing inner and outer annular passageways for receiving fuel/air premix, a plurality of combustors offset at an angle, and the use of an inlet centerbody and two aft bluff bodies, each having pilot fuel addition to assist in mixing and flame stabilization as taught herein.

FIG. 15 shows one embodiment of a unique trapped vortex combustor, wherein a simple bluff forebody (or "centerbody") is provided having an interchangeable body module location, and wherein an aft body is provided having fuel and air injection ports.

FIG. 16 is an embodiment similar to FIG. 15, now showing the addition of side struts which project laterally from the initial bluff forebody to create small recirculation zones for additional mixing.

Figure 2:
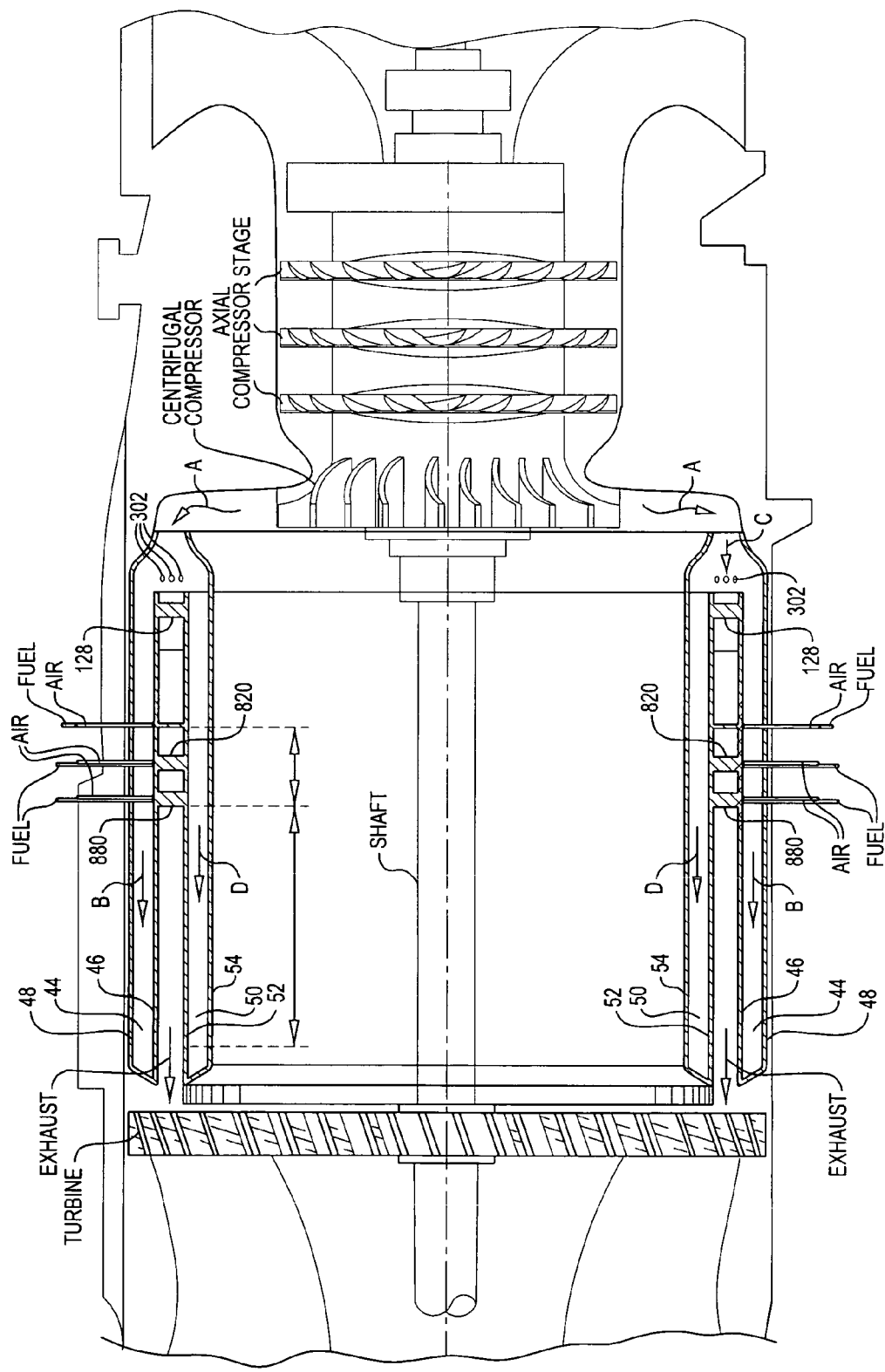
FIG. 2 shows a cross-sectional view of a novel combustor as taught herein, shown mounted for use in a gas turbine engine having a compressor with three axial and one centrifugal stage, with compressed air moving forward through the combustor and fuel inlets prior to the centerbody to prepare a fuel-air premix, and with exhaust gases driving a gas turbine affixed to a central shaft before exiting toward the front of the gas turbine.
Figure 3:
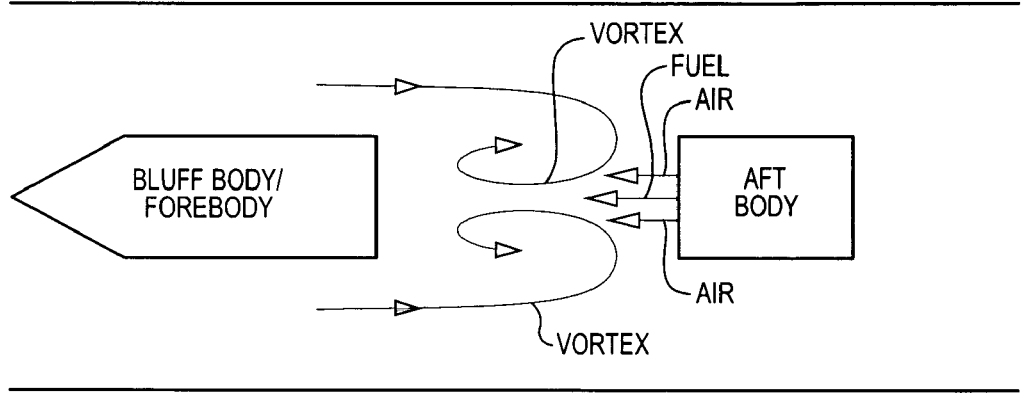
FIG. 3 is a simple schematic of a prior art trapped vortex combustor configuration, showing how the use of fuel and air injection to the combustion zone is designed to direct momentum of such added streams in the direction of the vortex resulting from bulk flow past the initial centerbody.

The foregoing figures, being merely exemplary, contain various elements that may be present or omitted from actual implementations depending upon the circumstances. An attempt has been made to draw the figures in a way that illustrates at least those elements that are significant for an understanding of the various embodiments and aspects of the invention. However, various other elements and parameters are also shown and briefly described to enable the reader to understand how various optional features may be utilized in order to provide an efficient, reliable combustor for a gas turbine engine.

DETAILED DESCRIPTION

A detailed view of an exemplary embodiment of a trapped vortex combustor 72 for a gas turbine engine is provided in FIG. 1. Inlet fluid, normally compressed air A as indicated by reference letter A is supplied through inlet 34 defined between inner inlet wall 36 and outer inlet wall 38. Downstream from inlet 34, inlet fluid A is divided into three streams, namely an outer cooling air supply B, a combustion air supply C, and an inner cooling air supply D. Leading edges 40 and 42 split entering air supply A thusly. The outer air cooling air supply B is contained within an outer plenum 44 defined between a combustor outer wall 46 and an outer plenum wall 48. The inner cooling air supply D is contained within an inner plenum 50 defined between a combustor inner wall 52 and an inner plenum wall 54. As illustrated, each of walls 48, 46, 52, and 54 are provided in substantial portion by tubular cylindrical sections of desirable diameter to fit other components in a gas turbine engine of desired size and power output. The location of combustor inner wall 52 and combustor outer wall 46 provide an annular combustor housing 60 within which a plurality of inlet centerbodies 128 (also called "forebodies") are placed. These centerbodies 128 extend from wall 52 to wall 46 and as shown, are offset at a helical angle alpha ($\alpha$) with respect to the longitudinal axial centerline 64 of the combustor housing 60. One suitable angle alpha ($\alpha$) is about 30 degrees (30°).

In situations where environmental concerns are significant, in order to obtain the proper conditions for combustion while producing low-pollution products of combustion, a fuel supply system provides a pre-mixing stage in which the fuel and combustion air are premixed prior to flow past the centerbodies 128. In this stage, as better illustrated in FIG. 10, fuel injectors 70 add the fuel F to an inlet fluid, normally air A or other fuel free oxidant containing stream (but which may contain some high value fuel such as hydrogen, or some low value fuel, such as coal bed methane, coal mine purge gas, landfill methane, biomass produced fuel gas, sub-quality natural gas, or other low grade fuels). In order to carry out the actual combustion step in an operationally reliable manner, the velocity of the compressed inlet fuel air pre-mix should preferably be high at the intermixing point between the trapped vortex combustor 72 and the delivery point of the combustible fuel/air mixture, so that flashback of the flame front from the trapped vortex combustor 72 toward the fuel injectors 70 is reduced or avoided. In the exemplary engine design described herein, when operated at the suitable conditions described herein, the residence time in the diffuser portion 74 is too short to initiate an auto-ignition process in the prescribed residence time. Further, the aerodynamics of the diffuser 74 design and of the inlet sections 76 and 78 are not conducive to flame holding.

Figure 10:
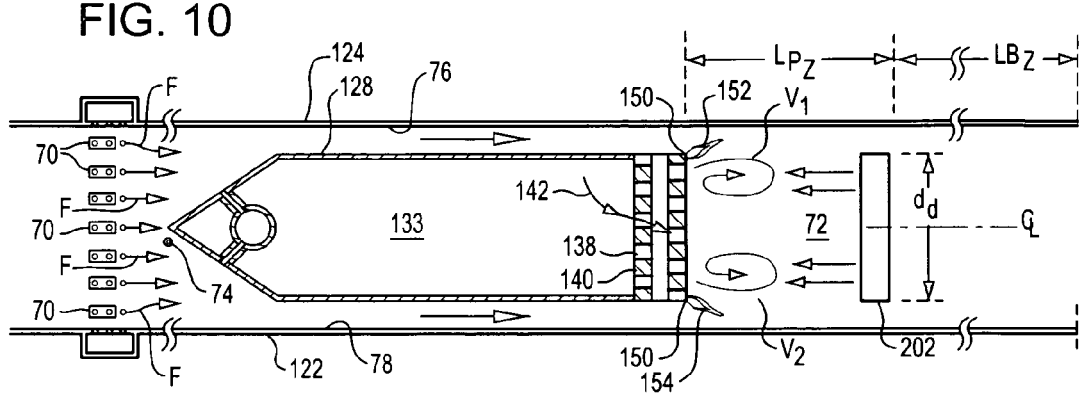
FIG. 10 illustrates a combustor design that includes a plurality of fuel mixing ports upstream of a centerbody, and fuel addition ports through the centerbody, to provide a lean premixed fuel to a trapped vortex combustor design.

In order to stabilize the combustion process downstream of the rear wall 104 of inlet centerbody 128, the velocity of gases through the trapped vortex combustor 72 is reduced by providing a trapped vortex combustor 72 having substantially larger cross-sectional flow area than provided by the inlet ducts 76 and 78 thereto. As seen in FIG. 10, localized recirculation zones are provided to confine trapped vortices V in order to have an adequate residence time to substantially minimize creation of carbon monoxide in the trapped vortex combustor 72, and a suitable length of burnout zone LBz is provided in order to bring the remaining CO in the exiting combustion gases to an environmentally acceptable low residual level.

Figure 7:
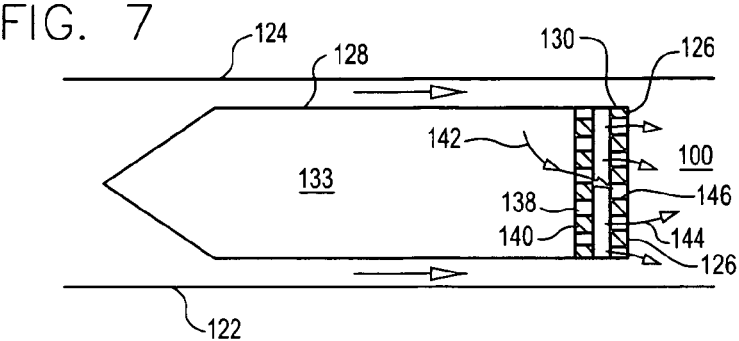
In FIG. 7, a combustor design is provided utilizing a simple bluff body, enhanced with respect to required cooling load, shown using a combination of backside impingement and effusion cooling on the flameholder face.
Figure 8:
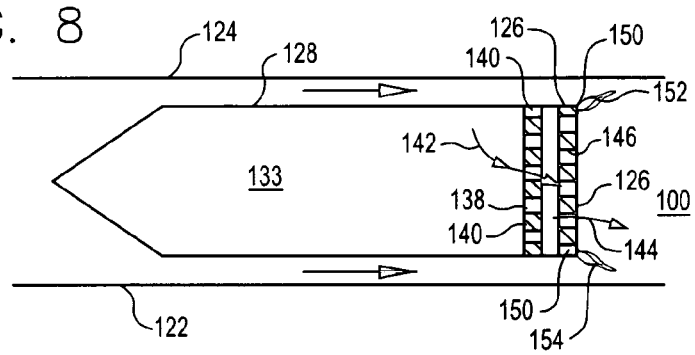
In FIG. 8, the combustor design is further enhanced via use of pilot fuel injectors to stabilize the primary combustion zone.

At the outset, we determined that the length of a primary mixing zone "LPz" in a combustor can be shortened considerably by adopting the configuration illustrated in FIGS. 7 and 8, even in the absence of trapped vortex cavities. These figures are views taken looking inward along a combustor, such as if radially mounted in the manner first set forth in FIG. 1 above, looking down on the exemplary combustor 100 taught herein. Combustor 100 is situated between a first wall 122 and a second wall 124, behind rear wall 126 of centerbody 128. In one embodiment, rear wall 126 of the centerbody 128 includes provision by way of a perforated wall 130 operably communicating with cooling gas source (for example, by pressurization of the interior space 133 of centerbody 128), for impingement cooling of rear wall 126 by the use of perforations 138 in interior rear wall 140, as indicated by reference arrows 142 in FIG. 7. Alternately, or in addition, effusion cooling is provided for rear wall 126, as indicated by cooling air flow 144 through perforations 146 in rear wall 126. The enhanced with the combination of impingement and effusion cooling on the rear wall/flameholder 126 of centerbody 128, utilizing an interior rear wall 140 with coolant passageways 138 therethrough, is useful in many configurations as indicated in other figures herein. Although this simple, robust bluff body combustor design allows easy sizing for the required inlet velocity, the combustion efficiency can be expected to be less than optimum since the length of primary zone is not as compact as it could be, and perhaps would encounter unsteady vortex shedding and reduced primary zone combustion intensity, and thus, would not be an optimum design solution for many commercially important combustor designs. Thus, combustion efficiency might be less than optimal. Therefore reduced combustion intensity would be expected, especially as compared to the novel trapped vortex combustors as explained below.

Figure 9:
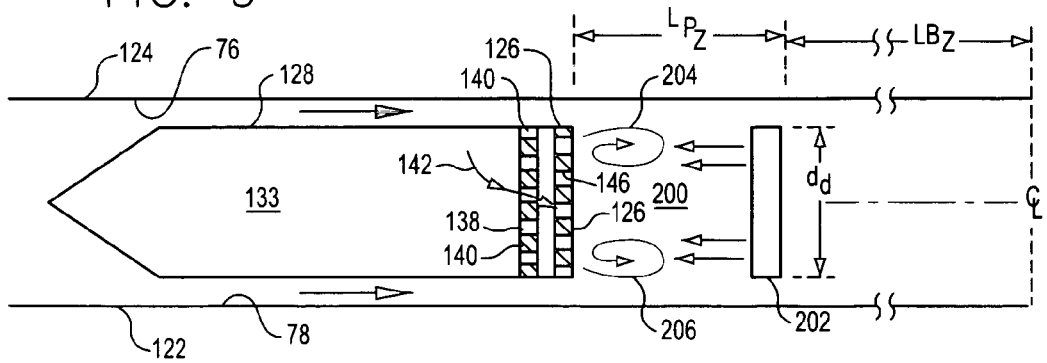
In FIG. 9, the combustor efficiency is further enhanced via use of a trapped vortex design, which locks stationary vortices between the fore (or "centerbody") and aft bodies, and enhances channel air and/or premix entrainment through the pumping of secondary airflow into the primary zone, while also adding fuel and/or air in opposition to the swirl direction of trapped vortex.

Turning now to FIG. 9, an exemplary combustor 200 has been developed. Combustor 200 is provided using an aft body 202 for provision of trapped vortices 204 and 206. This combustor 200 configuration has lower pressure drop through the combustor 200 relative to the simple bluff body configuration illustrated in FIGS. 7 and 8. Additionally, flame stability is improved through the locking of downstream vortices 204 and 206 between the rear wall 126 of centerbody (or "forebody") 128 and the aft body 202. And, by providing for sufficient space rearward (flow-wise) of the aft body 202, the burnout zone of length LBz is provided. Thus, a compact primary zone Pz having a relatively high combustor efficiency is provided. Note that this and other designs provided herein can advantageously utilize the combination of impingement and effusion cooling methods first discussed in connection with FIGS. 7 and 8 above.

In FIG. 9, the efficient combustion and high heat release per unit of combustor volume is made possible with a highly turbulent primary zone. Importantly, the jet impingement, and pumping action, as is further illustrated in FIG. 10, may increase combustor efficiency to at least 99% or more, and more preferably, to at least 99.5% or more. Note in FIG. 10, as well as FIG. 8, that fuel outlets 150 can be used to provide flame jets 152 and 154 to assist in the just mentioned pumping action.

Figure 4:
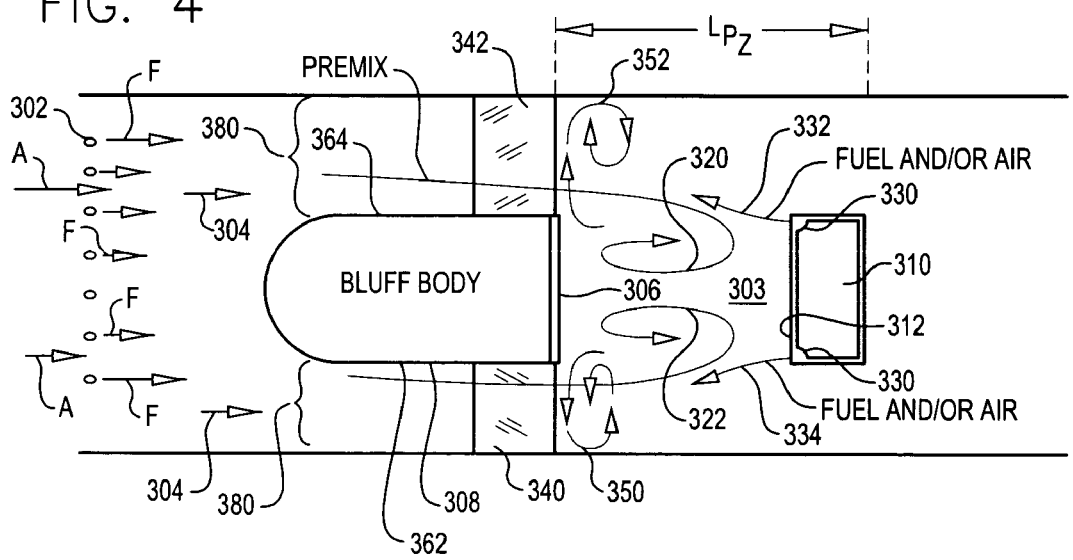
FIG. 4 shows a simple schematic of one embodiment of the present invention, wherein fuel and/or air injection is designed to project momentum in opposition to the direction of swirl resulting from bulk flow past the initial centerbody with the consequence of opposing vortex rotation.

By comparison of FIG. 4 to FIG. 9, one of the improvements in the art can be easily noted with respect to the design illustrated in FIG. 4. In FIG. 4, a trapped vortex combustor 300 for a gas turbine engine is provided. An air supply system provides inlet air A. A fuel supply system is provided for the supply of gaseous fuel F. The fuel supply system has a premix stage wherein fuel F from the fuel supply system is ejected from fuel supply structures 302 and mixed with inlet air A to provide a lean pre-mixture 304 upstream of a first 303 of one or more trapped vortex cavities. Here, a first trapped vortex cavity 303 is provided rearward of rear wall 306 of forebody 310. A first aft bluff body 310 with a front wall 312 is provided to define the rear or the first 303 trapped vortex cavity. Due to the bulk flow of the premix past the forebody 308, a predetermined inward bulk fluid swirl direction in the manner indicated by reference arrows 320 and 322 is provided. At least one pilot fuel stage is provided, using one or more pilot injectors 330 in fluid communication with the fuel supply system. Each of the least one of the one or more pilot injectors 330 are configured to inject fuel into a first 303 of said one or more trapped vortex cavities. As indicated in FIG. 4, the pilot injectors are configured to inject fuel as indicated by reference arrows 332 and 334 into the first 303 of the one or more trapped vortex cavities in a direction oriented to provide a jet from the pilot injectors 330 to provide momentum of fuel and burning gases in opposition to the bulk fluid swirls 320 and 322 of predetermined direction. Here, two pilot injectors 330 are provided, although this number may be adjusted as necessary to provide the necessary mixedness and to achieve the combustion efficiencies desired, as well as to provide the proper quantity of supplemental fuel. For example, it has been found that providing about 95% of the necessary gaseous fuel in the bulk premix is acceptable, and in such cases about 5% of the necessary gaseous fuel is then provided by the pilot fuel injector stage of the fuel supply system.

Figure 5:
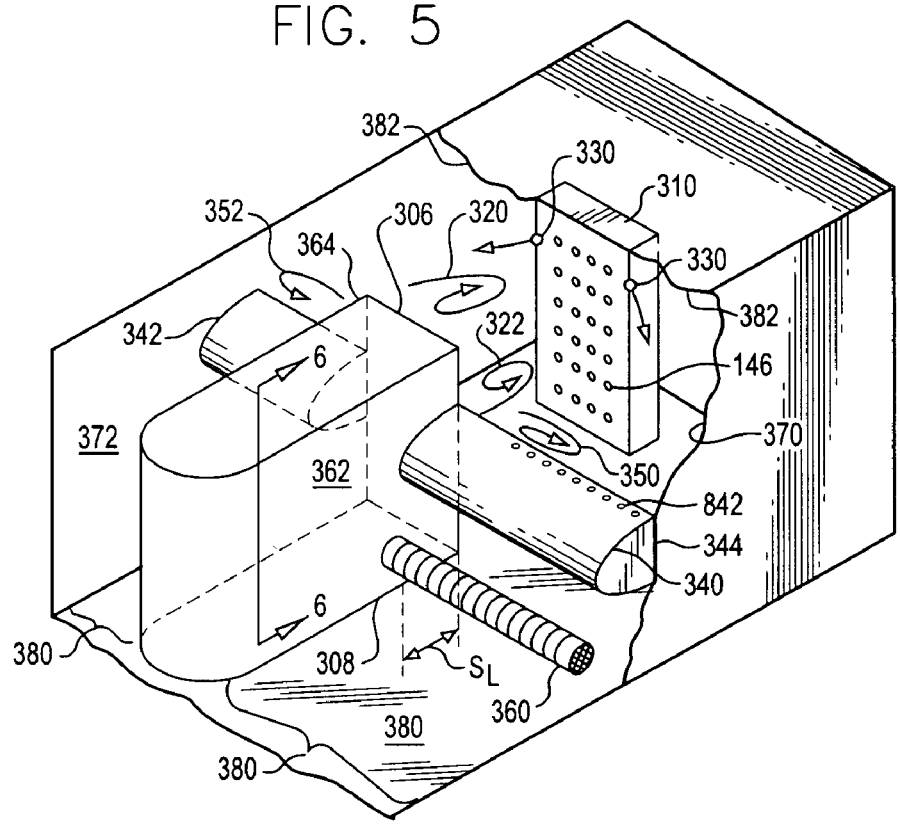
FIG. 5 is a perspective view of one embodiment of the present invention, similar to the flow scheme just depicted in FIG. 4, but now additionally including the use of side struts projecting laterally from the initial centerbody, the side struts create small recirculation zones for additional mixing of hot primary zone products into the incoming channel flow.

FIG. 5 provides a partially broken away perspective view of the exemplary trapped vortex combustor just illustrated in FIG. 4, now more clearly showing the use of first 340 and second 342 struts which are provided in partial airfoil shaped configuration with a rear wall 344 that is substantially co-planar with the rear wall 306 if forebody 308. The struts 340 and 342 introduce yet additional vortex locations for trapping vortexes 350 and 352. Note that the flow field will be three dimensional, not just in the transverse direction as indicated here for purposes of illustration and explanation. Alternately, a cylindrical, dowel shaped strut 360 can be provided. The cylindrical strut 360 is shown spaced upstream a length $S_L$ from rear wall 306 of forebody 308, and, if desired, struts 340 and 342 can likewise be located upstream from rear wall 306. As shown, struts, whether 340, 342, or 360, extend outward from first 362 or second 364 sidewalls of forebody 308 toward, and as configured in FIG. 5, to exterior sidewalls 370 and 372 of combustor 300. It should be understood that the combustor shown in FIG. 4 can advantageously utilize the cooling techniques for rear wall 306 as taught above with respect to FIGS. 7, 8 and 9.

Attention is again directed to FIG. 5, where In combustor 300, one or more duct passageways 380 are provided adjacent to the forebody 308. Such passageways are in this configuration defined between walls 364 and 372 on one side, and walls 362 and 370 on the other side, and between floor 380 and roof 382 of the combustor on both sides. The forebody rear wall 306 defines a dump plane having a cross-sectional area defined between the floor 380 and roof 382, and sidewalls 370 and 372. The cross-sectional area of the dump plane is the sum of (i) the cross-sectional area of the forebody rear wall 306 and (i) the cross-sectional area of all of the one or more duct passageways adjacent to the forebody rear wall 306. A blockage ratio determined by dividing the cross-sectional area of the forebody rear wall 306 by the total cross-sectional area of the dump plane is in excess of 60 percent. In one embodiment, the blockage ratio is approximately 63 percent.

Figure 6:
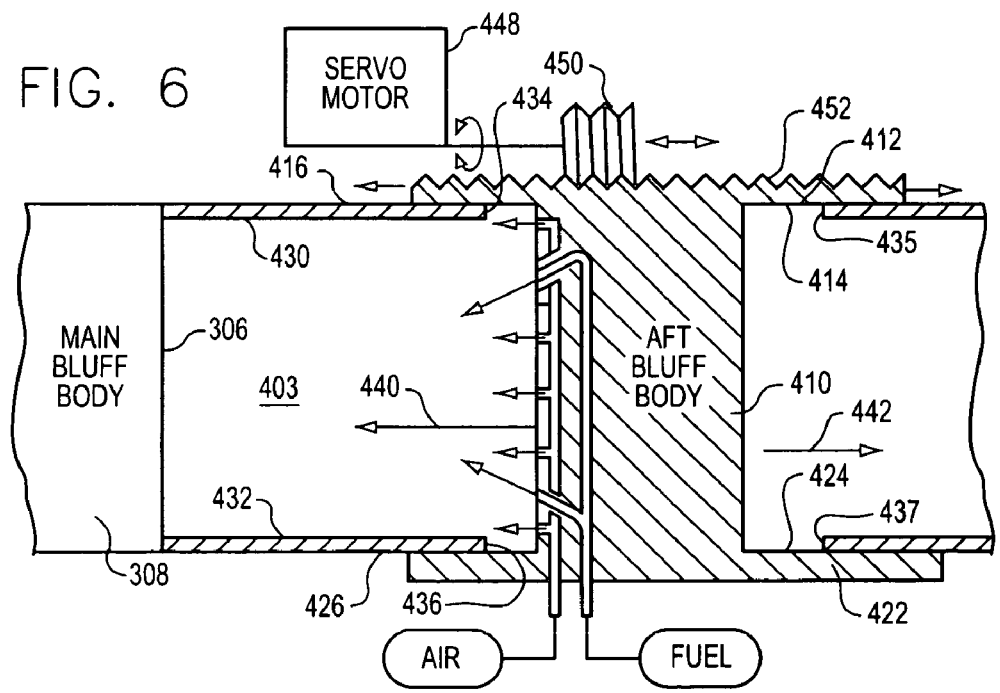
FIG. 6 illustrates a further embodiment of the present invention, now showing the use of an axially adjustable aft bluff body, wherein the bluff body can be adjusted in position with respect to the rear end of the main bluff body, to create a primary zone of desired size; also illustrated are the use of pilot fuel and cooling air outlets in the aft bluff body.

Attention is now directed to FIG. 6, where a combustor is provided with a unique trapped vortex cavity 403 with volume adjustment mechanism. This embodiment is shown as if taken through line 6—6 of FIG. 6, but with the addition of an adjustable aft bluff body 410. Aft bluff body 410 is provided with a substantially I-beam shape in which an upper flange 412 having a lower sealing surface 414 is provided for sealing against upper roof sealing surface 416. A lower flange 422 is provided having an upper sealing surface 424 for sealing against floor lower sealing surface 426. Roof 430 and floor 432 have gaps therein defined by edgewalls 434 and 435 with respect to the roof, and 436 and 437 with respect to the floor, and with respect to which the exact position of aft bluff body 410 is adjustable forward in the direction of reference arrow 440, or rearward in the direction of reference arrow 442. Adjustment is provided by action of servo motor 448 and appropriate gearing such as worm gear 450 acting on grooved teeth 452 in the upper flange 412. This configuration allows tuning of the vortex cavity 303 size for combustion efficiency.

Figure 11:
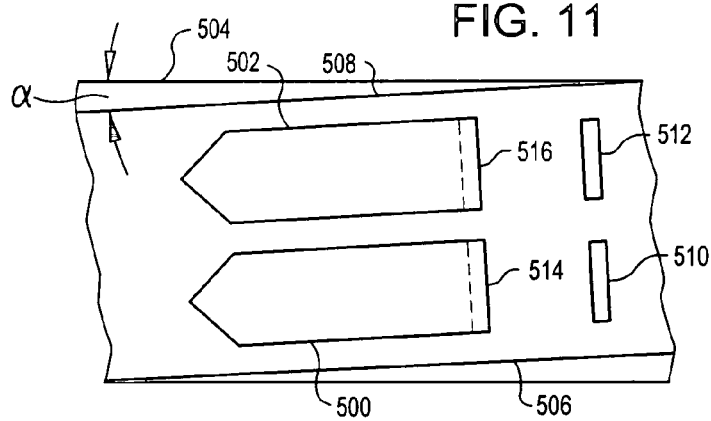
FIG. 11 schematically illustrates the trapped vortex combustor design just disclosed in FIG. 10, now showing the combustor centerline offset from a gas turbine centerline, in a manner such as that first illustrated in FIG. 1 above, to provide a helical flow structure within an annular space to extend the burnout zone, to reduce CO production.

FIG. 11 illustrates the use of multiple inlet centerbodies 500 and 502 between sidewalls 506 and 508, offset at a spiral or helical angle alpha (α) with respect to the centerline 504 of a gas turbine or other engine. The helical angle in a gas turbine engine can be up to about 30 degrees, or more. As illustrated, aft bodies 510 and 512 are provided rearward of flameholding rear walls 514 and 516 of centerbodies 500 and 502, in order to provide for trapping of a vortex between the rear wall 514 and aft body 510, and between rear wall 516 and aft body 512.

Figure 12:
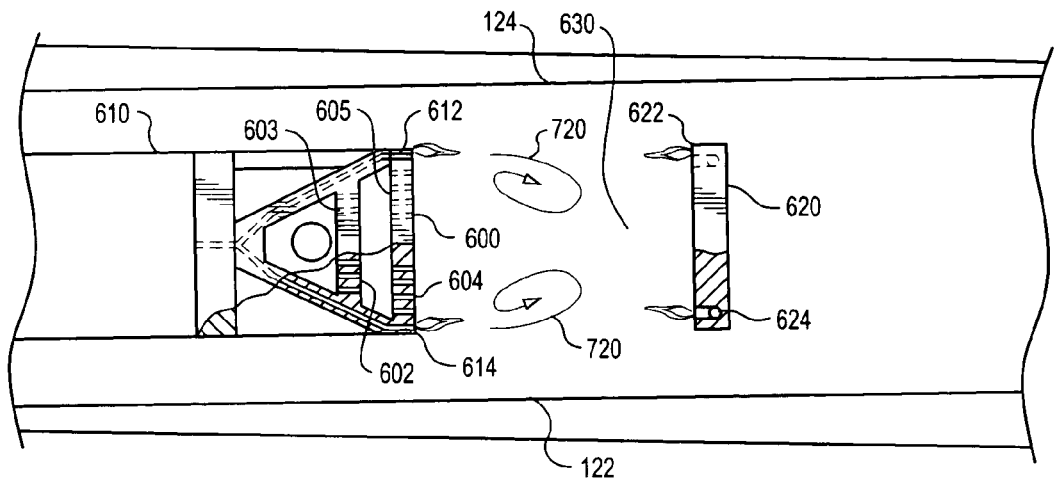
FIG. 12 illustrates, in partial cross-section taken looking down on a combustor, one trapped vortex combustor configuration, showing the use of fuel injection from a forebody to enhance flame stability, and with the use of fuel and/or air injection from an aft body to impart momentum in opposition to the swirl of the trapped vortex, in order to enhance mixing, combustion intensity, and combustion efficiency.

In FIG. 12, an exemplary enhanced double wall flameholding rear wall 600 with both impingement cooling passageways 602 in a first wall 603 and effusion cooling passageways 604 in a second wall 605 is provided for inlet centerbody 610. Also, pilot fuel ports 612 and 614 are provided. Additionally, an aft body 620 with pilot fuel ports 622 and 624 provide for trapped vortex operation of combustor 630.

Figure 13:
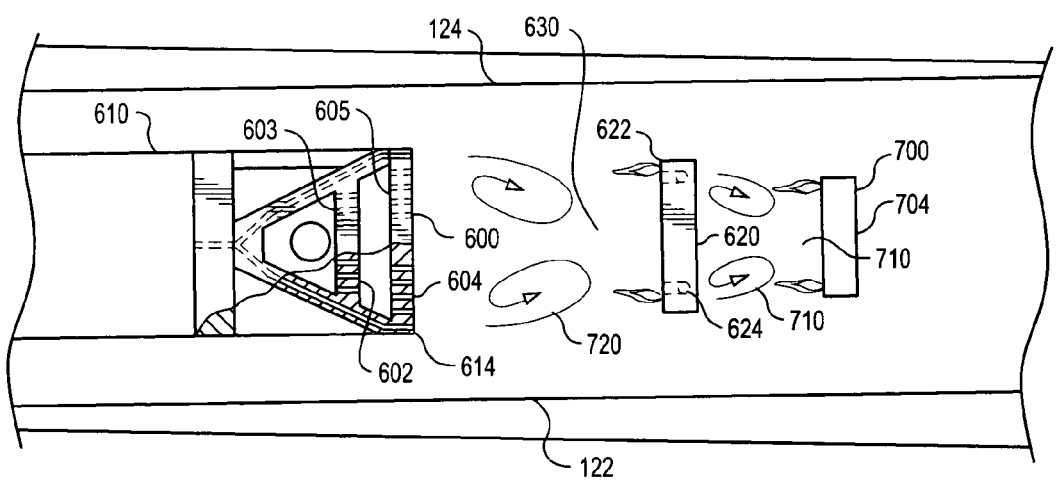
FIG. 13 illustrates, the combustor just shown in FIG. 12, but now adding a second aft bluff body, wherein the second aft bluff body utilizes injection of fuel and/or air to impart momentum in opposition to the swirl of the trapped vortex, in order to enhance mixing, combustion intensity, and combustion efficiency.

In FIG. 13, an exemplary double bluff body configuration is shown. Here both a first aft bluff body 620 and a second aft bluff body 700 are illustrated. This exemplary embodiment may utilize the double wall flameholding rear wall 600 configuration as just illustrated in FIG. 12 above. However, a second bluff body 700 with rear wall 704 is provided for creating both a second recirculation zone 710, in addition to the first recirculation zone 720 as illustrated in FIG. 12 above. This configuration allows further enhancement of combustion efficiency.

Figure 14:
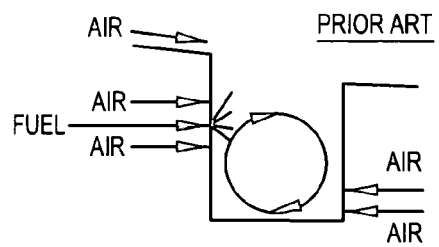
FIG. 14 graphically illustrates the use of fuel and air injection in a manner wherein fuel and air are injected to impart momentum in support of the swirl of the trapped vortex.

For background and reference, FIG. 14 graphically illustrates one prior art trapped vortex combustor design which uses the basic concept of providing fuel and air injection in a manner wherein fuel and air are directed so that the injection fluid jet imparts momentum to the swirling gases in a direction which is supporting of, rather than in opposition to, the direction of swirl of the trapped vortex. However, in the present invention, it has been discovered that improved combustion intensity and efficiency can be achieved by proving fuel and/or air injection directed so that the injection fluid imparts momentum to the swirling gases in a direction which is in opposition to, rather than supporting of, the direction of swirl of the trapped vortex.

FIG. 15 shows one embodiment of a unique trapped vortex combustor 800, with trapped vortex combustor 803 wherein a simple bluff forebody (or "centerbody") 802 is provided having an interchangeable body module location 804 for the supply of an interchangeable rear wall portion 805. The centerbody 802 has sidewalls 804 and 806 which define, together with combustor sidewalls 810 and 814, duct passageways 816. A first aft body 820 is provided having fuel passageways 830 and fuel injectors 832. Either a portion of burner fuel, or pilot fuel may be provided at injectors 832. Also provided in first aft body 820 are cooling air passageways 840 connected to a cooling air supply system, and cooling air injection ports 842 which deliver cooling air for film cooling of the aft bluff body 820. A plurality of perforations 842 are in fluid communication with the cooling air supply system, so that the plurality of perforations provide effusion cooling to the walls, especially including the forward wall 821, of the first aft bluff body 820. In the embodiment further indicated in FIG. 19, the perforations 842 are provided having a passageway 843 upstream of the outlet configured at a selected pitch angle (i.e. up and down with respect to the longitudinal flow axis indicated as centerline 850 in FIG. 15) and yaw angle (i.e., side to side with respect to the longitudinal flow axis indicated as centerline 850 in FIG. 15) with respect so said forward wall of said first aft bluff body. In one embodiment a pitch angle of the perforations is about 30 degrees upward in the upstream direction. In such an embodiment, it is also useful to provide the perforations in a yaw angle of about 30 degrees to one side or the other, so that a cooling film circulates around the bluff body 820, either clockwise or counterclockwise. Normally, such perforations are provided with uniform pitch and yaw angles, so as to create a uniform cooling air film that sweeps across said forward wall of said first aft bluff body. However, as further indicated in FIG. 18, the uniform pitch and yaw angles can be reversed on first 860 and second 862 sides (i.e., up on one side and down on the other) to create a swirling action for the film cooling. In such cases an upward angle omega ($\Omega$) may be provided equal to a downward pitch angle beta ($\beta$), but preferably, the swirl direction is maintained uniformly.

Turning now to FIG. 16, this embodiment similar to FIG. 15, but now shows an improved combustor 801 which utilizes the addition of side struts 870 and 872 which project laterally from the initial bluff forebody to create small recirculation zones for additional mixing of hot burning gases, to thereby improve combustion efficiency. As illustrated, such struts 870 and 872 are similar to struts 340 and 342 depicted in FIG. 5.

Figure 17:
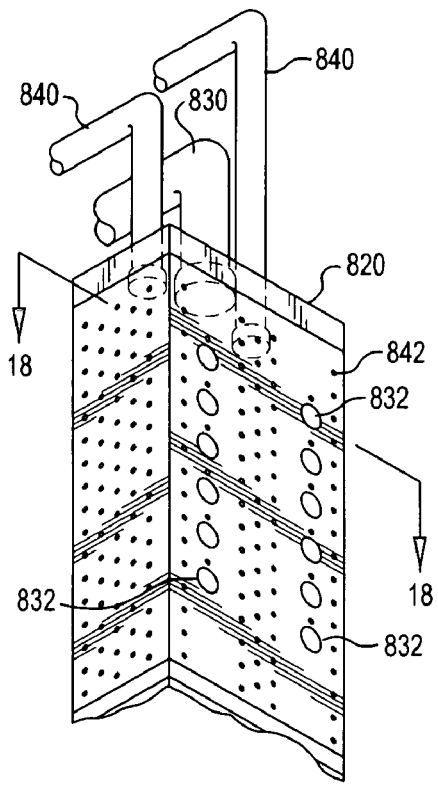
FIG. 17 is a partially cut away perspective view of an exemplary interchangeable aft bluff body, showing the location of cooling air ports and fuel and air injection ports.
Figure 19:
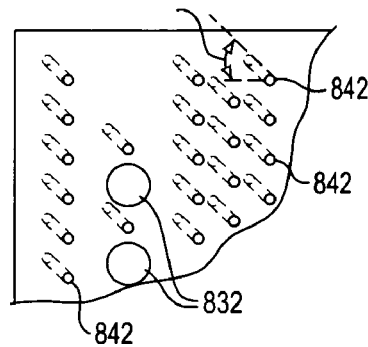
FIG. 19 is a partial side view of the aft bluff body, now showing the orientation of cooling air outlets, as well as several pilot fuel outlets.
Figure 18:
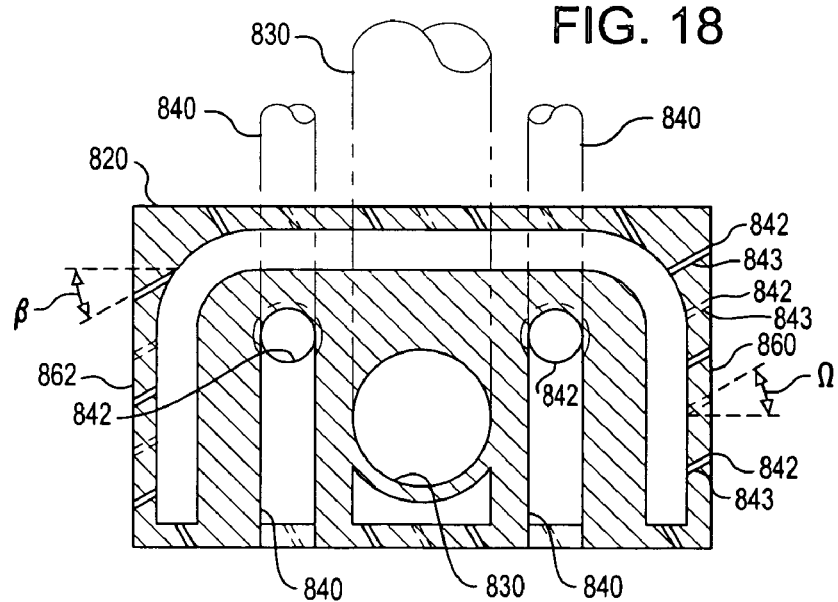
FIG. 18 is a partial cross-sectional view, taken through line 18—18 of FIG. 17, now showing the fuel and air passageways, and cooling air outlets angled to enhance flow of cooling air circumferentially around the aft bluff body.

FIG. 17 is a partially cut away perspective view of an exemplary interchangeable aft bluff body 820, showing the location of cooling air ejection ports 842 and fuel injection ports 832. FIG. 18 is a partial cross-sectional view, taken through line 18—18 of FIG. 17, now showing the fuel 830 and air 840 passageways, as well as further details of the cooling air outlets angled to enhance flow of cooling air circumferentially around the aft bluff body, as just discussed above. FIG. 19 is a partial side view of the aft bluff body 820, now showing the orientation of cooling air outlets 842, as well as several pilot fuel outlets 832.

Figure 20:
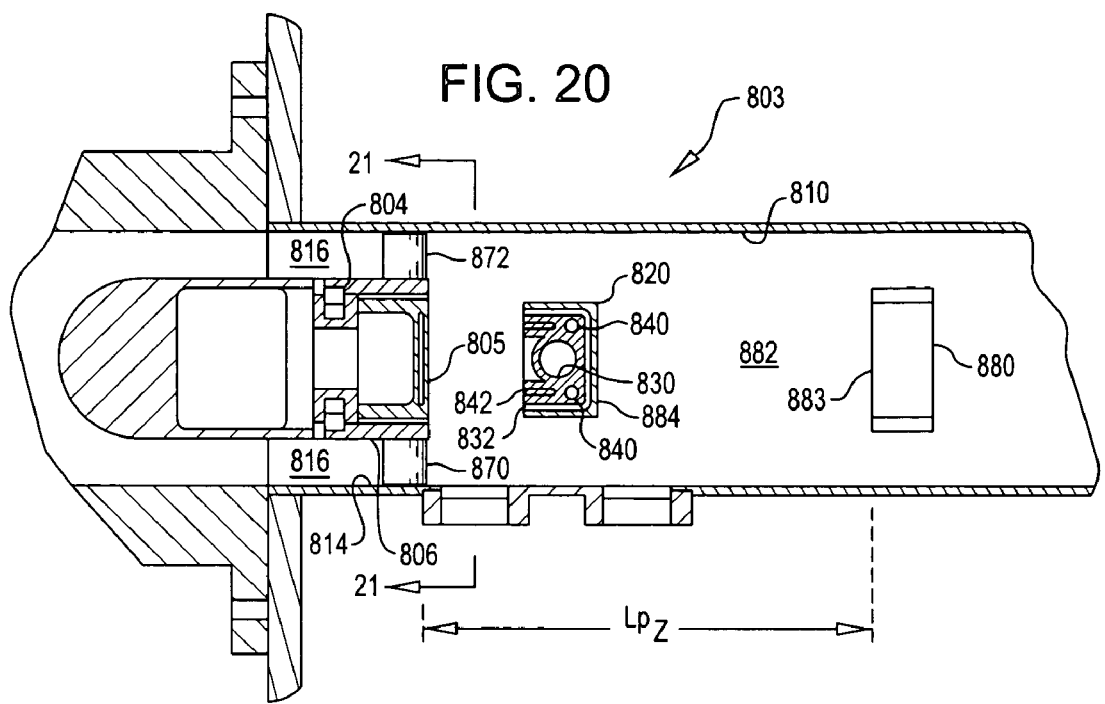
FIG. 20 depicts yet another embodiment, similar to that shown in FIG. 16, including the use of side struts adjacent the forebody, but now additionally showing the use of a second aft body to provide a secondary trapped vortex combustor of desired length.

FIG. 20 depicts yet another embodiment for a combustor 803, similar to that shown in FIG. 16, including the use of side struts 870 and 872 adjacent the forebody 802, but now additionally showing the use of a second aft body 880 having a forward wall 882 to provide a secondary trapped vortex cavity 882 between wall 882 and rear wall 884 of first aft body 820, for providing a trapped vortex combustor of desired length.

As previously mentioned the TVC combustion concept relies on inhibiting vortex shedding from the bluff body which would otherwise destabilize the primary zone and hence prematurely limit the system's operating envelop. Wide operating envelopes are highly desired for most combustion systems, especially for land based ones due to part power requirements. Furthermore, the intense combustion activity existing between the fore and aft bodies (see FIG. 16) should serve as a mechanism to facilitate the interaction between the cold charge and hot combustion products, thereby encouraging competitive emissions levels. For evaluation of performance, the values of the air-to-fuel (A/F) ratio are normalized by the stoichiometric air-to-fuel (A/F) ratio, to obtain the equivalence ratio, $\phi=(A/F)$ stoichiometric/(A/F) measured. With this definition, $\phi>1$ indicates fuel rich operation, and $\phi<1$ indicates fuel lean operation. In general, while maximum efficiency occurs when the mixture is lean, unfortunately NOx production is enhanced over certain lean mixture ranges, although as combustion temperatures further decrease with increasingly lean mixtures, the NOx production also decreases. Thus, an improved TVC burner design as taught herein which results in efficient combustion of lean mixtures while decreasing undesirable emissions is an important improvement in the art.

The discussion which follows details testing which was conducted on two TVC configurations: one as shown in FIG. 15, and another as shown in FIG. 16 with side struts located at the dump plane to further enhance mixing.

First, with respect to the TVC depicted in FIG. 15, two tests were completed with the basic TVC and bluff body installation. Fueling was effectuated using the premixed fuel systems and TVC fuel legs. No bluff body fueling (partial premixing) or diffusion piloting were utilized. All testing centered on 5% (3.5% total air) front end air loading to the TVC and 95% front end air to the channel. Three distinct primary zone (front end) equivalence ratio ($\phi_{fe}$) points were tested (0.51, 0.55, 0.60), with variations in the TVC to main fueling fractions for the prescribed primary zone (front end) equivalence ratio ($\phi_{fe}$). The liner cooling air load was maintained at 25% (overall air flow percentage) throughout all TVC (FIG. 16 struts and FIG. 15 no strut configuration) tests. Attempts were made at increasing the air loading to the TVC to 10% front end air loading but were unsuccessful due to blow out and/or hardware overtemping (liner and/or IE module thermocouples). It should be noted that throughout all excursions, liner temperatures were not uniform along the length of the combustor, ranging from 800 to 1700° F., depending on the location of the heat release and/or fuel loading (equivalence ratio). Full combustion pressure (275 psia) and preheat temperatures (761° F.) were attained.

Figure 23:
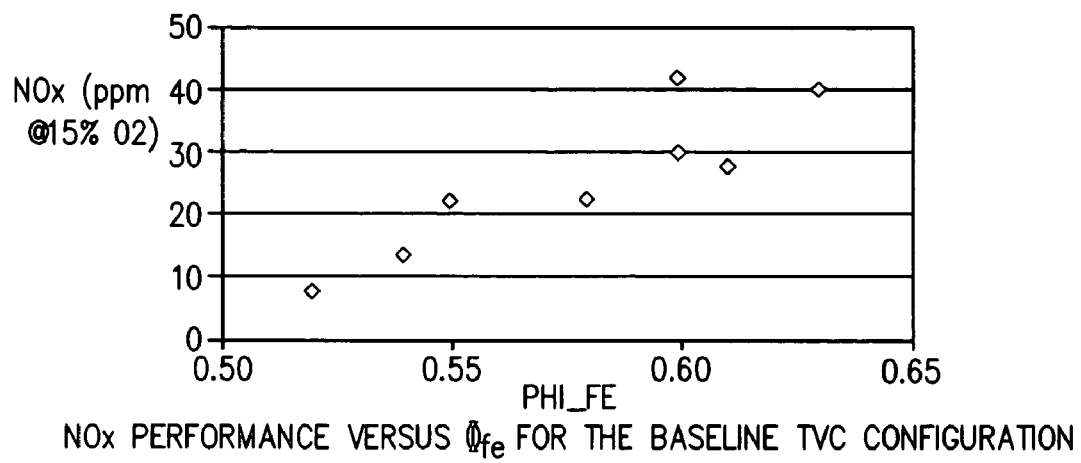
FIG. 23 graphically illustrates the relationship of NOx performance versus the primary zone (front end) equivalence ratio, where $\phi_{fe}$=total fuel/front end air, for a tested baseline TVC configuration.
Figure 24:
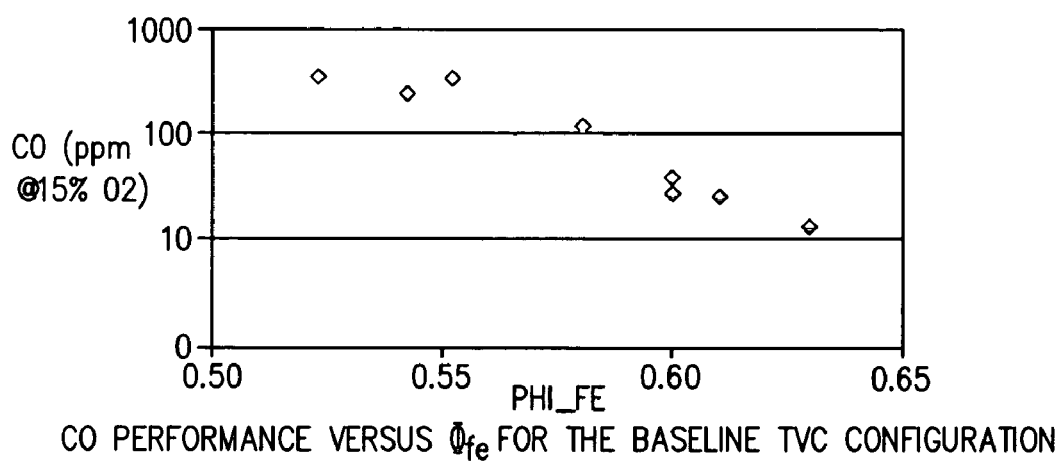
FIG. 24 graphically illustrates the relationship of CO performance versus primary zone (front end) equivalence ratio $(\phi_{fe})_{for}$ a tested baseline TVC configuration.

FIGS. 23 and 24 denotes the NOx and CO emissions, respectively, versus primary zone (front end) equivalence ratio ($\phi_{fe}$) for all data acquired under this configuration, irrespective of the TVC/channel fuel splits. Note that emissions were corrected to a 15% O2 standard. The NOx emissions demonstrate the typical behavior with increasing primary zone (front end) equivalence ratio ($\phi_{fe}$) or front end flame temperature: increasing primary zone flame temperature increases NOx emissions due to the primary NOx generation mechanism. The CO emissions, conversely, demonstrate the inverse trend which is again, typical for kinetic CO production. Apparently, the equilibrium CO production mechanism whereby CO levels begin to increase with temperature was not attained with excursions during testing. Note the use of a logarithmic scale on the y-axis is due to the rapid jump in CO levels with leaner mixtures.

Figure 25:
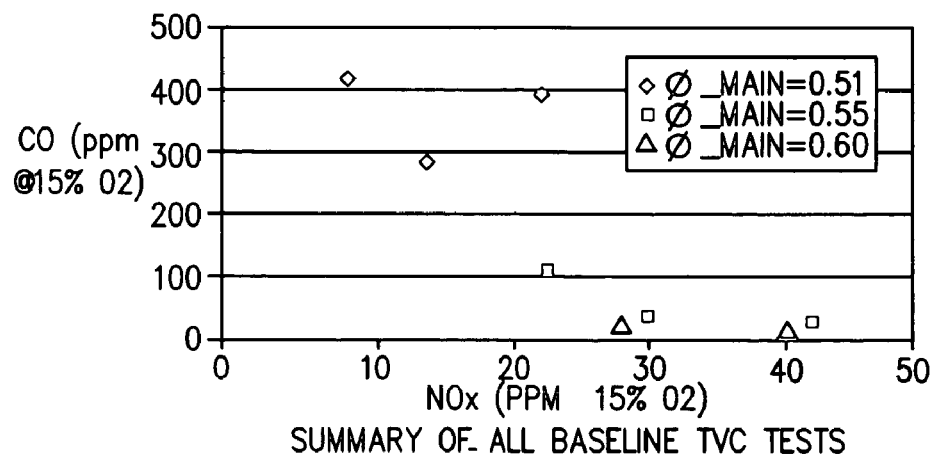
FIG. 25 graphically illustrates the relationship of NOx vs. CO in summary fashion for baseline TVC tests which were conducted.

FIG. 25 compiles the three excursions in main equivalence ration values (051, 0.55 and 0.60) with a plot of NOx versus CO emissions. At each channel based equivalence ratio, where $\phi_{main}$=channel fuel/channel air, the excursions in TVC based equivalence ratio, $\phi_{tvc}$=TVC fuel/TVC air, were undertaken in attempts at holding total fuel levels constant per the design table. This lead to wide excursions in TVC equivalence ratios: 0.51–1.5. Apparently the lower equivalence ratio setting has a dramatic effect on the CO production in that high levels (hundreds of ppm) were produced over the excursion. On richening the overall, front end equivalence ration, sizeable drops in CO were achieved as the mixture effectively "burnt out" or converted the CO to CO2.

Figure 27:
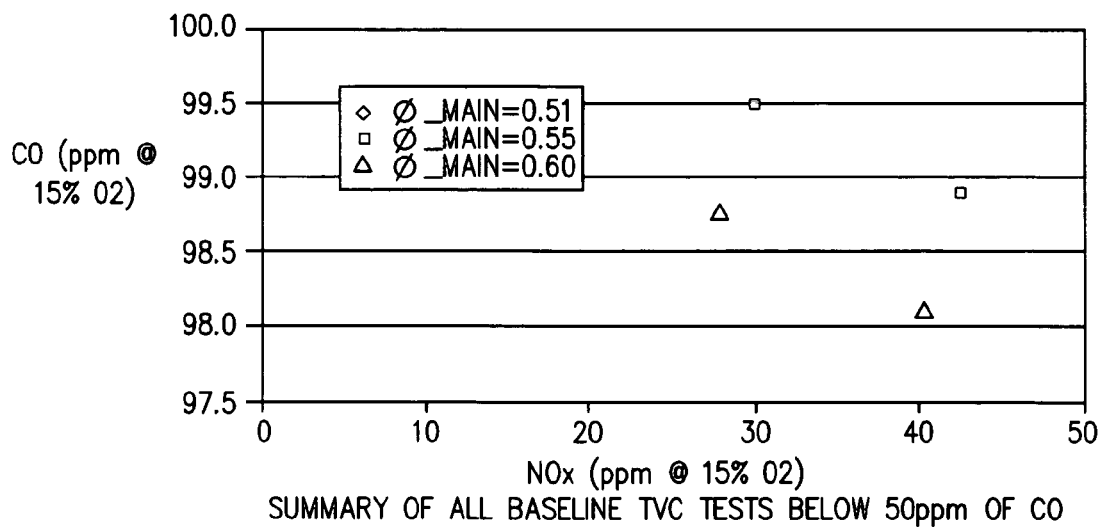
FIG. 27 graphically illustrates the relationship of NOx vs. CO for baseline TVC tests which were conducted, for the cases where CO was below 50 ppm.

The optimal fueling split achieved was with a main equivalence ratio, $\phi_{main}$=0.6 whereby a simultaneous NOx/CO values of 28/28 ppm corrected to 15% O2 were recorded. See FIG. 27 below which is an enlargement of the previous figure. Note that the main equivalence ratio, $\phi_{main}$=0.51 curve, has been excluded from the data set for clarity.

Figure 26:
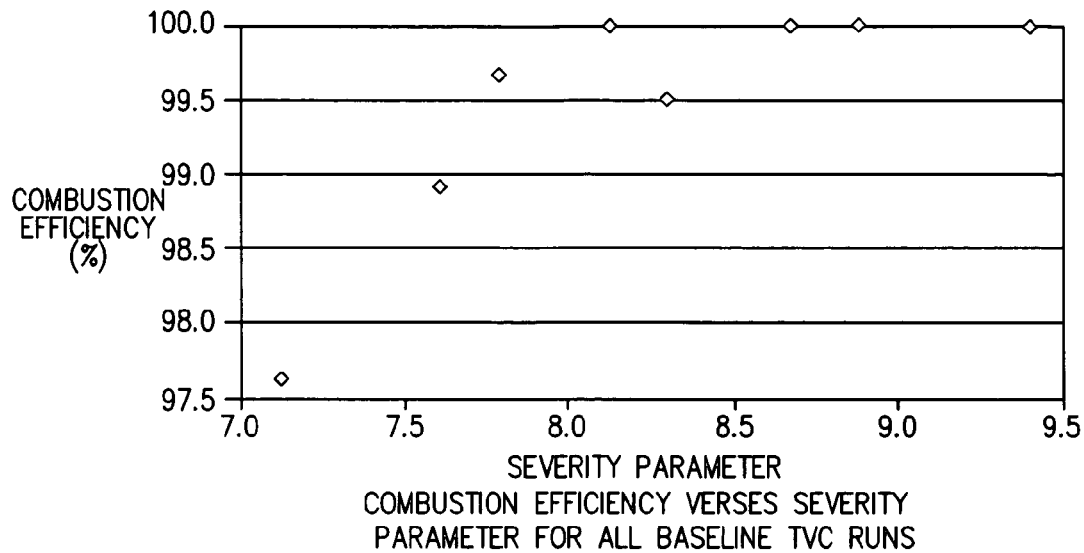
FIG. 26 graphically illustrates the relationship of combustion efficiency versus severity parameter for baseline TVC tests which have been conducted.

The final figure in the set (FIG. 26) denotes the emissions based combustion efficiency versus the Severity Parameter (SP) which was defined by Roquemore et al., in 2001, as follows:

$$SP = (P_{comb}/14.7)^{0.26808} * \exp(T_{inlet}/257.693) * 0.0581 * \phi_{oa} * (\phi_{tvc}/\phi_{oa})^{0.291096}$$

In essence, the Severity Parameter mimics a loading parameter which effectively standardizes various fuel/air scheduling studies. Clearly shown is the increase in efficiency as the loading parameter increases from 7.0 to 8.0, where-after it levels off. The increase is expected due to the intensification of turbulence and hence combustion activity within the TVC region (region between the bluff body and aft body) under the action of increasing fuel loading. More important, however, is the high levels of efficiency (>99.5%) demonstrated. This is a tribute to the superior nature of the novel design provided herein as a whole relative to other flame stabilizer concepts such as axial and/or radial inflow premixers.

Figure 21:
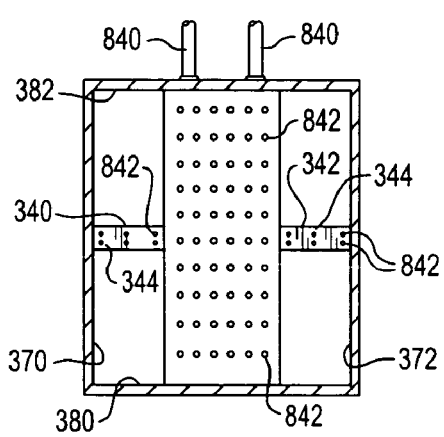
FIG. 21 depicts the use of the forebody illustrated in FIG. 16 in a square combustor cross-sectional configuration.
Figure 22:
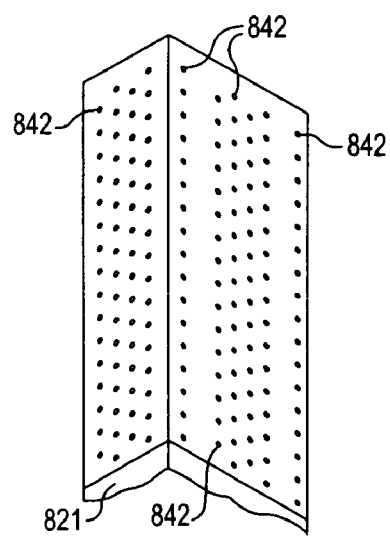
FIG. 22 illustrates one embodiment for a second aft body, wherein only cooling air holes are provided, i.e., no fuel and/or air (other than cooling air) is injected in this embodiment of the second aft body.

With respect to the design depicted in FIG. 16, i.e., a TVC with struts, the data confirms that further augmentation of the interaction of the primary and highly energetic core flow with the cold, co-flowing is required to fully exploit the benefits of the TVC concept. When the hot and turbulent combustion products between the fore and aft body are distributed more effectively within the channel flow, higher combustion intensity and hence efficiency results. Furthermore, this heightened interaction reduces CO emissions since ignition is commenced earlier within the liner, thereby allowing more time for burnout. In the test, four, 0.25 inch diameter rods were installed as struts at the dump plane, spanning equal flow areas to serve as conduits for the hot TVC combustion products into the channel flow. A simple row of cooling holes 842 (see FIG. 21, for similar configuration) was employer along the axis of the rods to ensure reliability of the part at the combustor temperature, Table 1 details the exact data points run for this hardware configuration. A combustion pressure of approximately 270 psia and TVC equivalence ratio ($\phi_{tvc}$) of 0.75 were maintained for all points. After establishing these baseline conditions, excursions in front end equivalence ratio were conducted through adjustments of the channel or main equivalence ratio ($\phi_{main}$).

Figure 28:
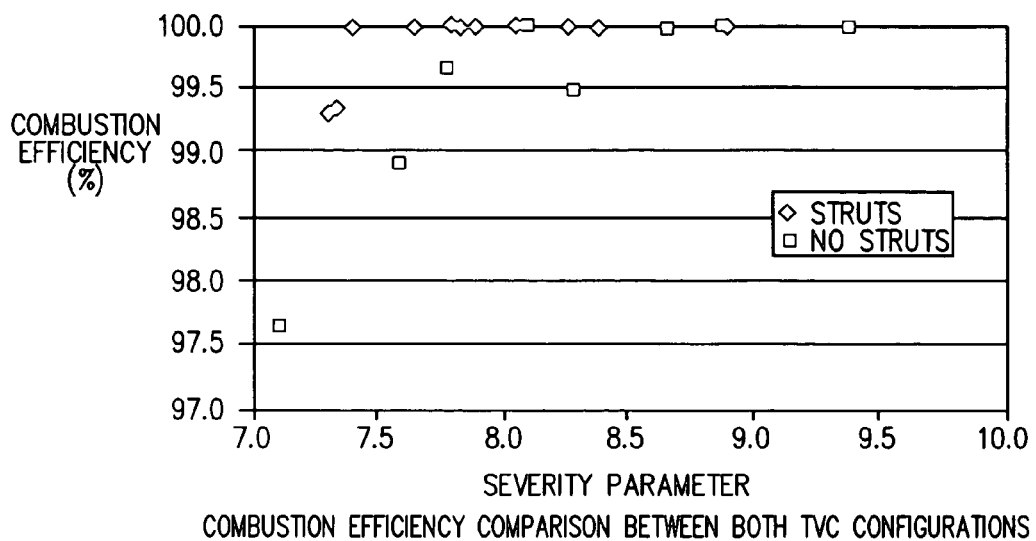
FIG. 28 graphically illustrates the relationship of combustion efficiency versus severity parameter for two different TVC configurations, namely a trapped vortex combustor without struts, and a trapped vortex combustor with struts.
Figure 29:
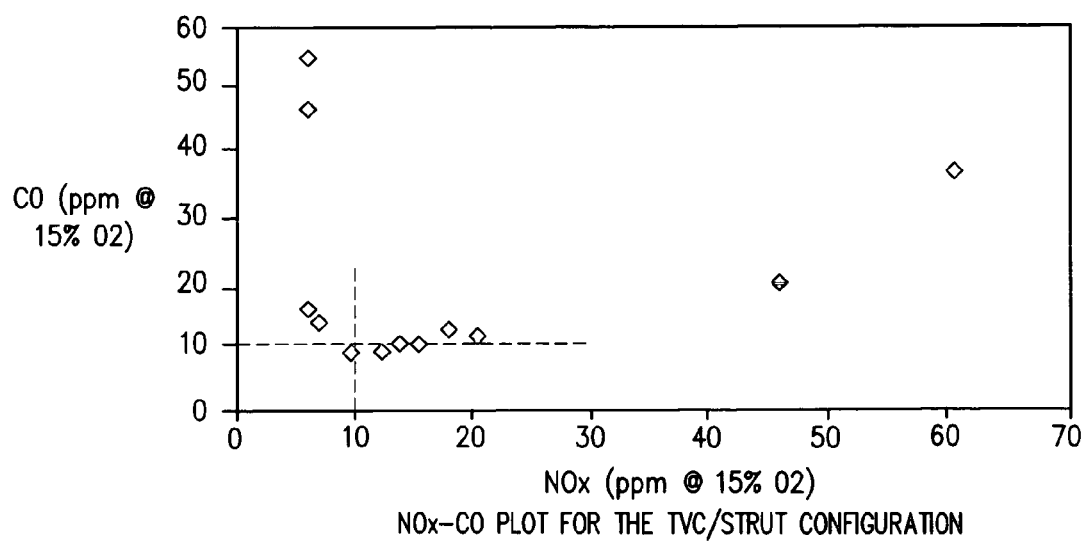
FIG. 29 graphically illustrates the relationship of NOx vs. CO in summary fashion for tests of a trapped vortex combustor with struts, as taught herein.

FIG. 28 below compares the results of such a modification to the baseline TVC results shown earlier. Again, combustion efficiency is plotted versus the Severity Parameter, SP. Clearly shown is the greater breadth of near 100% combustion efficiency relative to the previous runs; the region of near perfect combustion efficiency extends to lower Severity Parameter values than before.

Perhaps the greatest proof of this configuration's performance gains can be demonstrated by a plot of CO versus NOx (corrected to 15% O2) were achieved over a sizeable stoichiometric range, far superior to all prior configurations (TVC or bluff body). Furthermore, the 10 ppm NOx/10 ppm CO threshold was even achieved and exceeded. The curve demonstrates both CO generation mechanisms: equilibrium production for richer mixtures and kinetic production for the leaner mixtures. The importance of encouraging the interaction between the cold and hot charge has been clearly demonstrated.

Combustion testing on three hardware configurations has been completed. Testing commenced on the simplest flame stabilizer (bluff body, i.e. FIG. 7) with a 63% blockage ratio with expected levels of success. Combustion efficiencies above 99% were routinely achieved but competitive combustion exhaust gas emissions were not. The second test series evaluated the TVC concept which relies on locking a vortex pair between a fore and aft body (i.e., FIG. 15). This configuration resulted in dropping emissions levels from the hundreds (characteristic of the bluff body configuration) to the 20–30 ppm range, with resulting gains is overall combustion efficiency (>99%). Knowledge that promoting the interaction between the highly turbulent TVC and channel flow is favorable for efficiency gains, lead to the evaluation of a third concept which utilized struts within the channel itself (FIGS. 4, 5 and 16). For testing purposes, rods were used as struts, as noted in FIG. 4. These sheltered conduits were shown to be effective in increasing the interaction of the incoming cold premix stream and the hot circulating burning gases. The resulting emissions levels (below 10 ppm NOX/CO and high combustion efficiencies (>99.9%) have proven the success of this configuration for possible implementation into an industrial gas turbine system.

It is to be appreciated that the various aspects and embodiments of the combustion chamber designs described herein are an important improvement in the state of the art of trapped vortex combustors. Although only a few exemplary embodiments have been described in detail, various details are sufficiently set forth in the drawings and in the specification provided herein to enable one of ordinary skill in the art to make and use the invention(s), which need not be further described by additional writing in this detailed description. Importantly, the aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive. This disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

The invention claimed is:

1. A trapped vortex combustor, said trapped vortex combustor comprising:
    (a) one or more trapped vortex cavities;
    (b) an air supply system to supply inlet air;
    (c) a fuel supply system for the supply of gaseous fuel, said fuel supply system comprising
        (i) a premix stage wherein fuel from said fuel supply system is mixed with said inlet air to provide a lean pre-mixture upstream of a first one of said one or more trapped vortex cavities;
        (ii) at least one fuel stage comprising one or more injectors in fluid communication with said fuel supply system, at least one of said one or more injectors configured to inject fuel into a first one of said one or more trapped vortex cavities;
    (d) said first one of said one or more trapped vortex cavities configured to provide a bulk fluid swirl in a predetermined direction;
    (e) said at least one of said one or more injectors that is configured to inject fuel into said first one of said one or more trapped vortex cavities oriented to provide a jet from said at least one injector to provide momentum of fuel and burning gases in opposition to said bulk fluid swirl predetermined direction.

2. A combustor as set forth in claim 1, comprising two or more injectors in fluid communication with said fuel supply system, each of said two or more injectors directed to provide a jet of fuel to provide momentum in opposition to said bulk fluid swirl predetermined direction.

3. A combustor as set forth in claim 1, wherein said combustor comprises a forebody having a rear wall, and a first aft body having a forward wall, and wherein a first one of said one or more trapped vortex cavities is located between said forebody rear wall and said aft body forward wall.

4. A combustor as set forth in claim 3, wherein said combustor comprises a second aft body having a forward wall, and wherein said first aft body further comprises a rear wall, and wherein a second one of said one or more trapped vortex cavities is located between said rear wall of said first aft body and said forward wall of said second aft body.

5. A combustor as set forth in claim 4, wherein said combustor includes at least a first fuel stage and a second fuel stage, and wherein said second fuel stage provides at least one fuel injector to supply fuel to said second one of said one or more trapped vortex cavities.

6. A combustor as set forth in claim 5, wherein said blockage ratio is approximately 63 percent.

7. A combustor as set forth in claim 3, wherein said combustor comprises one or more duct passageways adjacent to said forebody, and wherein said forebody rear wall defines a dump plane having a cross-sectional area, and wherein said cross-sectional area of said dump plane is the sum of (i) the cross-sectional area of said forebody rear wall and (ii) the cross-sectional area of one or more duct passageways adjacent to said forebody rear wall, and wherein a blockage ratio determined by dividing the cross-sectional area of said forebody rear wall by the total dump plane cross-sectional area is in excess of 60 percent.

8. A combustor as set forth in claim 3, wherein said rear wall of said forebody is cooled by effusion cooling.

9. A combustor as set forth in claim 3, wherein said rear wall of said forebody is cooled by impingement cooling.

10. A combustor as set forth in claim 3, wherein said first aft body is cooled by effusion cooling.

11. A combustor as set forth in claim 3, further comprising one or more side struts extending outward from said forebody.

12. A combustor as set forth in claim 11, wherein said side struts extend outward from a location adjacent said forebody rear wall.

13. A combustor as set forth in claim 11 or in claim 12, wherein said side struts comprise cylindrical dowels.

14. A combustor as set forth in claim 11 or in claim 12, wherein said side struts comprise a partial airfoil shape having a downstream end portion.

15. A combustor as set forth in claim 3, wherein said forebody further comprises an outer sidewall sufficiently sealingly affixed to said rear wall of said forebody to form within said forebody a pressurizable cooling air plenum, said cooling air plenum in fluid communication with said rear wall of said forebody, so as to supply impingement cooling to said rear wall of said forebody.

16. A combustor as set forth in claim 15 wherein said rear wall comprises a plurality of perforations in fluid communication between said pressurizable cooling air plenum and said first one of said one or more trapped vortex cavities, said plurality of perforations configured to provide effusion cooling to said rear wall of said forebody.

17. A combustor as set forth in claim 16, wherein said perforations are provided at a selected pitch angle and yaw angle with respect to said rear wall.

18. A combustor as set forth in claim 17, wherein said pitch angle of said perforations is about 30 degrees upward.

19. A combustor as set forth in claim 18, wherein said yaw angle is about 30 degrees.

20. A combustor as set forth in claim 17, wherein said perforations are provided with uniform pitch and yaw angles, so as to create a cooling air film that sweeps across said rear wall of said forebody.

21. A combustor as set forth in claim 3, further comprising a cooling air supply system, and wherein said first aft bluff body comprises a plurality of perforations in fluid communication with said cooling air supply system, said plurality of perforations configured to provide effusion cooling to said forward wall of said first aft bluff body.

22. A combustor as set forth in claim 21, wherein said perforations are provided at a selected pitch angle and yaw angle with respect to said forward wall of said first aft bluff body.

23. A combustor as set forth in claim 22, wherein said pitch angle of said perforations is about 30 degrees upward.

24. A combustor as set forth in claim 23, wherein said yaw angle is about 30 degrees.

25. A combustor as set forth in claim 22, wherein said perforations are provided with uniform pitch and yaw angles, so as to create a cooling air film that sweeps across said forward wall of said first aft bluff body.

26. The apparatus as set forth in claim 1, wherein emissions of oxides of nitrogen (NOx) are less than 20 parts per million, corrected to 15% oxygen.

27. The apparatus as set forth in claim 1, wherein emissions of oxides of nitrogen (NOx) are less than 10 parts per million, corrected to 15% oxygen.

28. The apparatus as set forth in claim 1, wherein emissions of carbon monoxide is less than 20 parts per million, corrected to 15% oxygen.

29. The apparatus as set forth in claim 1, wherein emissions of carbon monoxide is less than 10 parts per million, corrected to 15% oxygen.

30. The apparatus as set forth in claim 1, wherein (a) emissions of oxides of nitrogen (NOx) are less than 10 parts per million, corrected to 15% oxygen, and (b) emissions of carbon monoxide are less than 10 parts per million, corrected to 15% oxygen.

31. The apparatus as set forth in claim 30, wherein combustion efficiency exceeds 99.5 percent.

32. The apparatus as set forth in claim 30, wherein combustion efficiency is equal to or greater than 99.9 percent.

33. The apparatus as set forth in claim 30, wherein emissions of oxides of nitrogen (Nox) are 9.7 parts per million by volume, or less, corrected to 15% oxygen.

34. The apparatus as set forth in claim 30, wherein emissions of oxides of nitrogen (Nox) are 6.72 parts per million by volume, or less, corrected to 15% oxygen.

35. The apparatus as set forth in claim 30, wherein emissions of oxides of nitrogen (Nox) are 5.85 parts per million by volume, or less, corrected to 15% oxygen.

36. The apparatus as set forth in claim 30, wherein emissions of carbon monoxide are equal to 9.0 parts per million by volume, or less, corrected to 15% oxygen.

37. The apparatus as set forth in claim 1, wherein said fuel injectors comprise pilot fuel injectors.

38. The apparatus as set forth in claim 1, further comprising one or more air injectors, and wherein at least one of said one or more air injectors are oriented to provide a jet in opposition to said bulk fluid swirl predetermined direction.

39. The apparatus as set forth in claim 1, wherein emissions of oxides of nitrogen (Nox) are 9.70 parts per million by volume, or less, corrected to 15% oxygen.

40. The apparatus as set forth in claim 1, wherein emissions of oxides of nitrogen (Nox) are 6.72 parts per million by volume, or less, corrected to 15% oxygen.

41. The apparatus as set forth in claim 1, wherein emissions of oxides of nitrogen (Nox) are 5.85 parts per million by volume, or less, corrected to 15% oxygen.

42. The apparatus as set forth in claim 1, wherein emissions of carbon monoxide are 50.5 parts per million by volume, or less, corrected to 15% oxygen.

43. The apparatus as set forth in claim 1, wherein emissions of carbon monoxide are 14.3 parts per million by volume, or less, corrected to 15% oxygen.

44. The apparatus as set forth in claim 1, wherein emissions of carbon monoxide are 9.0 parts per million by volume, or less, corrected to 15% oxygen.

45. A method of operating a trapped vortex combustor, said method comprising:
  (a) providing a trapped vortex combustor, said trapped vortex combustor comprising:
    (1) one or more trapped vortex cavities, said one of said one or more trapped vortex cavities configured to provide a bulk fluid swirl in a predetermined direction;
    (2) an air supply system to supply inlet air;
    (3) a fuel supply system for the supply of gaseous fuel, said fuel supply system comprising (i) a premix stage wherein fuel from said fuel supply system is mixed with said inlet air to provide a lean pre-mixture upstream of a first one of said one or more trapped vortex cavities; and (ii) at least one fuel stage comprising one or more injectors in fluid communication with said fuel supply system, at least one of said one or more injectors configured to inject fuel into a first one of said one or more trapped vortex cavities;
  (b) injecting fuel through at least one of said one or more injectors that is configured to inject fuel into said first one of said one or more trapped vortex cavities in an fluid injection direction oriented to provide a jet from said at least one of said one or more injectors, to provide momentum of injected fuel in opposition to said bulk fluid swirl predetermined direction.

46. The method as set forth in claim 45, wherein said trapped vortex combustor further comprises one or more air injectors, and wherein said method further comprises the step of injecting air through at least one of said one or more air injectors to provide momentum of injected air in opposition to said bulk fluid swirl predetermined direction.

47. The method as set forth in claim 45, wherein said trapped vortex combustor comprises a combustor in a gas turbine engine.

48. The method as set forth in claim 45, wherein emissions of oxides of nitrogen (NOx) are 20 parts per million by volume, or less, corrected to 15% oxygen.

49. The method as set forth in claim 45, wherein emissions of oxides of nitrogen (NOx) are 10 parts per million by volume, or less, corrected to 15% oxygen.

50. The method as set forth in claim 45, wherein emissions of oxides of nitrogen (NOx) are 9.70 parts per million by volume, or less, corrected to 15% oxygen.

51. The method as set forth in claim 45, wherein emissions of oxides of nitrogen (NOx) are 6.72 parts per million by volume, or less, corrected to 15% oxygen.

52. The method as set forth in claim 45, wherein emissions of oxides of nitrogen (NOx) are 5.85 parts per million by volume, or less, corrected to 15% oxygen.

53. The method as set forth in claim 45, wherein emissions of carbon monoxide are 20 parts per million by volume, or less, corrected to 15% oxygen.

54. The method as set forth in claim 45, wherein emissions of carbon monoxide are 10 parts per million by volume, or less, corrected to 15% oxygen.

55. The method as set forth in claim 45, wherein (a) emissions of oxides of nitrogen (NOx) are 10 parts per million by volume, or less, corrected to 15% oxygen, and (b)

emissions of carbon monoxide are 10 parts per million by volume, or less, corrected to 15% oxygen.

56. The method as set forth in claim 45, or in claim 55, wherein emissions of oxides of nitrogen (NOx) are 9.7 parts per million by volume, or less, corrected to 15% oxygen.

57. The method as set forth in claim 45, or in claim 55, wherein emissions of carbon monoxide are 9.0 parts per million by volume, or less, corrected to 15% oxygen.

* * * * *

UNITED STATES PATENT AND TRADEMARK OFFICE
CERTIFICATE OF CORRECTION

PATENT NO. : 7,003,961 B2
APPLICATION NO. : 10/430849
DATED : February 28, 2006
INVENTOR(S) : Donald Kendrick, Shawn P. Lawlor and Robert C. Steele It is certified that error appears in the above-identified patent and that said Letters Patent is hereby corrected as shown below:

Column 1, line 33, after the words "disclosure of each of which is incorporated herein in their entirety by this reference.", insert the following paragraph:

--STATEMENT OF GOVERNMENT INTEREST
   This invention was made with Government support under Contract No. DE-FC26-00NT40915 awarded by the United States Department of Energy. The U.S. Government has certain rights in the invention.--.

Column 4, line 67, after the word "ratio ($\Phi_{fe}$)", delete "$_{for}$" and substitute therefor --for--.
Column 7, line 61, after the words "rear wall 306", delete "if" and substitute therefor --of--.
Column 8, line 10, after the words "where", delete "In" and substitute therefor --in--.
Column 8, line 20, after the words "wall 306 and", delete "(i)" and substitute therefor --(ii)--.
Column 9, line 18, delete "proving" and substitute therefor --providing--.
Column 9, line 63, after the words "this embodiment", add --is--.
Column 10, line 19, after the words, "a forward wall", delete "882" and substitute therefor --883--.
Column 11, line 24, after the words "ration values", delete "(051," and substitute therefor --(0.51,--.
Column 12, line 16, after the words "ration) was", delete "employer" and substitute therefor --employed--.
Column 12, line 17, after the words "temperature", delete "," and substitute therefor --.--.

Signed and Sealed this

Twenty-first Day of October, 2008

JON W. DUDAS
*Director of the United States Patent and Trademark Office*